US012646449B2

(12) United States Patent
Ren et al.

(10) Patent No.: US 12,646,449 B2
(45) Date of Patent: Jun. 2, 2026

(54) FLIP-FLOP CIRCUIT AND PIXEL DRIVING CIRCUIT

(71) Applicant: BOE Technology Group Co., Ltd., Beijing (CN)

(72) Inventors: Jinyu Ren, Beijing (CN); Fangzhen Zhang, Beijing (CN); Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/993,559

(22) PCT Filed: Apr. 17, 2024

(86) PCT No.: PCT/CN2024/088271
§ 371 (c)(1),
(2) Date: Jan. 12, 2025

(87) PCT Pub. No.: WO2024/244763
PCT Pub. Date: Dec. 5, 2024

(65) Prior Publication Data
US 2026/0031017 A1 Jan. 29, 2026

(30) Foreign Application Priority Data
May 31, 2023 (CN) ......................... 202310637570.0

(51) Int. Cl.
*G09G 3/3225* (2016.01)
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0814* (2013.01);
(Continued)

(58) Field of Classification Search
CPC .................. G09G 3/32; G09G 3/3233; G09G 2300/0814; G09G 2300/0819; G09G 2300/0857; G09G 2320/064; G09G 3/3225
(Continued)

(56) References Cited

U.S. PATENT DOCUMENTS

2016/0253958 A1* 9/2016 Ma ....................... G09G 3/3225
345/211

FOREIGN PATENT DOCUMENTS

| | | |
|---|---|---|
| CN | 108182916 A | 6/2018 |
| CN | 114333685 A | 4/2022 |

* cited by examiner

*Primary Examiner* — Abdul-Samad A Adediran
(74) *Attorney, Agent, or Firm* — HOUTTEMAN LAW LLC

(57) ABSTRACT

A flip-flop circuit and a pixel driving circuit are provided. In the flip-flop circuit, the AND gate is configured to control a clock signal output from the output terminal based on input signals of the first and second input terminals; the input sub-circuit is configured to write the second power supply voltage into the first and/or second input terminal in response to an input control signal to control the output terminal to output the first or second power supply voltage; the control sub-circuit is configured to control a potential at a first node through the second power supply voltage in response to a data voltage control signal; the duty ratio adjustment sub-circuit is configured to control the output terminal to output the first power supply voltage in response to a potential at the first node.

20 Claims, 15 Drawing Sheets

(52) U.S. Cl.
CPC ............... *G09G 2300/0819* (2013.01); *G09G 2300/0857* (2013.01); *G09G 2320/064* (2013.01)

(58) Field of Classification Search
USPC .......................................................... 345/211
See application file for complete search history.

FLIP-FLOP CIRCUIT AND PIXEL DRIVING CIRCUIT

TECHNICAL FIELD

The present disclosure relates to the field of circuit technology, and in particular to a flip-flop circuit and a pixel driving circuit.

BACKGROUND

A PAM (Pulse Amplitude Modulation) driving mode is a main driving mode for a grey scale of a current display product. With the continuous development of a series of display technologies such as LCD (Liquid Crystal Display), OLED (Organic Light Emitting Diode), LED (Light Emitting Diode), QD (Quantum Dot), disadvantages, such as having a high driving power consumption, generating a great amount of heat, incapable of realizing the low grey scale display, of the PAM driving mode are more and more prominent. Therefore, a PWM (Pulse Width Modulation) driving mode for a grey scale is introduced on the basis of the PAM driving mode for solving such the problems. The introduction of the PWM driving mode greatly increases the complexity of a driving circuit, which obstructs the development of advanced technologies, such as a high PPI (Pixels Per Inch), and a narrow border. In addition, the complex processes may reduce the yield and further increase the cost. The current PWM driving mode has a low driving frequency, which stings eyes to some extent. Therefore, it is necessary to further improve the current PWM driving mode, in order to achieve a healthy display. The current PWM driving mode is a full-screen driving mode, or a timing signal with a fixed duty ratio, which is introduced into a pixel driving circuit, is combined with the PAM driving mode to realize the low grey scale display. These two circuit designs increase the complexity of the driving circuit, and do not solve the problems of having a high power consumption, and generating a great amount of heat. In view of the above problems, it is urgently needed to develop a new driving circuit for a gray scale, to follow the development of the display technology.

SUMMARY

The present invention is directed to at least one of the technical problems in the related art, and provides a flip-flop circuit and a pixel driving circuit.

In a first aspect, an embodiment of the present disclosure provides a flip-flop circuit, including an input sub-circuit, an AND gate, a control sub-circuit, a duty ratio adjustment sub-circuit, and a reset sub-circuit; wherein the AND gate includes a first input terminal, a second input terminal and an output terminal, and is configured to control a clock signal output from the output terminal based on input signals of the first input terminal and the second input terminal of the AND gate, and each clock cycle of the clock signal jumps between a first power supply voltage and a second power supply voltage; the input sub-circuit is configured to write the second power supply voltage into the first input terminal and/or the second input terminal in response to an input control signal to control the output terminal to output the first power supply voltage or the second power supply voltage; the control sub-circuit is configured to control a potential at a first node through the second power supply voltage in response to a data voltage control signal, and the first node is a connection node between the control sub-circuit and the duty ratio adjustment sub-circuit; the duty ratio adjustment sub-circuit is configured to control the output terminal to output the first power supply voltage in response to the potential at the first node to adjust a duty ratio of the clock signal; and the reset sub-circuit is configured to respond to a reset signal and reset the potential at the first node through the reset signal.

In an embodiment, the AND gate includes a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a second power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a first power supply voltage terminal, and a control electrode of the seventh transistor is connected to the second input terminal; and a control electrode of the eighth transistor is connected to the first input terminal.

In an embodiment, the AND gate includes a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a first power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a second power supply voltage terminal, and a control electrode of the seventh transistor is connected to the second input terminal; and a control electrode of the eighth transistor is connected to the first input terminal.

In an embodiment, the input sub-circuit includes a first transistor; and switching characteristics of the first transistor and the fifth transistor are the same; a first electrode of the first transistor is connected to the second power supply voltage terminal, a second electrode of the first transistor is connected to the first input terminal, and a control electrode of the first transistor is connected to an input signal control terminal; the second input terminal is connected to the second power supply voltage terminal; or a first electrode of the first transistor is connected to the second power supply voltage terminal, a second electrode of the first transistor is connected to the first input terminal and the second input terminal, and a control electrode of the first transistor is connected to an input signal control terminal.

In an embodiment, the duty ratio adjustment sub-circuit includes a third transistor, a first capacitor, and a second capacitor; the control sub-circuit includes a fourth transistor; switching characteristics of the third transistor and the switching characteristics of the first transistor are the same; and switching characteristics of the fourth transistor and the switching characteristics of the first transistor are opposite to each other; a first electrode of the third transistor is connected to the first power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the second power supply voltage terminal, a second electrode of the fourth transistor is connected to the first node, and a control electrode of the fourth transistor is connected to a data voltage control signal terminal.

In an embodiment, the duty ratio adjustment sub-circuit includes a third transistor, a first capacitor, and a second capacitor; the control sub-circuit includes a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor; a first electrode of the third transistor is connected to the first power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the second power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the first input terminal.

In an embodiment, the input sub-circuit includes a first transistor; and switching characteristics of the first transistor and the fifth transistor are the same; and a first electrode of the first transistor is connected to the second power supply voltage terminal, a second electrode of the first transistor is connected to the second input terminal, and a control electrode of the first transistor is connected to an input signal control terminal; and the first input terminal is connected to the second power supply voltage terminal.

In an embodiment, the duty ratio adjustment sub-circuit includes a third transistor, a first capacitor, and a second capacitor; the control sub-circuit includes a fourth transistor; switching characteristics of the third transistor and the switching characteristics of the first transistor are the same; and switching characteristics of the fourth transistor and the switching characteristics of the first transistor are opposite to each other; a first electrode of the third transistor is connected to the first power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the second power supply voltage terminal, a second electrode of the fourth transistor is connected to the first node, and a control electrode of the fourth transistor is connected to a data voltage control signal terminal.

In an embodiment, the duty ratio adjustment sub-circuit includes a third transistor, a first capacitor, and a second capacitor; the control sub-circuit includes a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor; a first electrode of the third transistor is connected to the first power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the second power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the second input terminal.

In an embodiment, the reset sub-circuit includes a second transistor; and a first electrode of the second transistor is connected to a control electrode of the second transistor and a reset signal terminal, and a second electrode of the second transistor is connected to the first node.

The embodiment of the present disclosure further provides a flip-flop circuit, including an input sub-circuit, an AND gate, a control sub-circuit, a duty ratio adjustment sub-circuit, and a reset sub-circuit; wherein the AND gate includes a first input terminal, a second input terminal and an output terminal, and is configured to control a clock signal output from the output terminal based on input signals of the first input terminal and the second input terminal of the AND gate, and each clock cycle of the clock signal jumps between a first power supply voltage and a second power supply voltage; the input sub-circuit is configured to write the first power supply voltage into the first input terminal and/or the second input terminal in response to an input control signal to control the output terminal to output the first power supply voltage or the second power supply voltage; the control sub-circuit is configured to control a potential at a first node through the second power supply voltage in response to a data voltage control signal, the first node is a connection node between the control sub-circuit and the duty ratio adjustment sub-circuit; the duty ratio adjustment sub-circuit is configured to control the output terminal to output the first power supply voltage in response to the potential at the first node to adjust a duty ratio of the clock signal; and the reset sub-circuit is configured to respond to a reset signal and reset the potential at the first node through the reset signal.

In an embodiment, the AND gate includes a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a second power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a first power supply voltage terminal, and a control electrode of the seventh transistor is connected to the second input terminal; and a control electrode of the eighth transistor is connected to the first input terminal.

In an embodiment, the AND gate includes a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a first power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a second power supply voltage terminal, and a control electrode of the seventh transistor is connected to the second input terminal; and a control electrode of the eighth transistor is connected to the first input terminal.

In an embodiment, the input sub-circuit includes a first transistor; and switching characteristics of the first transistor and the fifth transistor are opposite to each other; a first electrode of the first transistor is connected to the first power supply voltage terminal, a second electrode of the first transistor is connected to the first input terminal, and a control electrode of the first transistor is connected to an input signal control terminal; the second input terminal is connected to the second power supply voltage terminal; or a first electrode of the first transistor is connected to the first power supply voltage terminal, a second electrode of the first transistor is connected to the first input terminal and the second input terminal, and a control electrode of the first transistor is connected to an input signal control terminal.

In an embodiment, the duty ratio adjustment sub-circuit includes a third transistor, a first capacitor, and a second capacitor; the control sub-circuit includes a fourth transistor; switching characteristics of the third transistor and the switching characteristics of the first transistor are the same; and switching characteristics of the fourth transistor and the switching characteristics of the first transistor are opposite to each other; a first electrode of the third transistor is connected to the second power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the first power supply voltage terminal, a second electrode of the fourth transistor is connected to the first node, and a control electrode of the fourth transistor is connected to a data voltage control signal terminal.

In an embodiment, the duty ratio adjustment sub-circuit includes a third transistor, a first capacitor, and a second capacitor; the control sub-circuit includes a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor; a first electrode of the third transistor is connected to the second power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the first power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the first input terminal.

In an embodiment, the input sub-circuit includes a first transistor; and switching characteristics of the first transistor and the fifth transistor are opposite to each other; and a first electrode of the first transistor is connected to the first power supply voltage terminal, a second electrode of the first transistor is connected to the second input terminal, and a control electrode of the first transistor is connected to an input signal control terminal; and the first input terminal is connected to the second power supply voltage terminal.

In an embodiment, the duty ratio adjustment sub-circuit includes a third transistor, a first capacitor, and a second capacitor; the control sub-circuit includes a fourth transistor; switching characteristics of the third transistor and the switching characteristics of the first transistor are the same; and switching characteristics of the fourth transistor and the switching characteristics of the first transistor are opposite to each other; a first electrode of the third transistor is connected to the second power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the first power supply voltage terminal, a second electrode of the fourth transistor is connected to the first node, and a control electrode of the fourth transistor is connected to a data voltage control signal terminal.

In an embodiment, the duty ratio adjustment sub-circuit includes a third transistor, a first capacitor, and a second capacitor; the control sub-circuit includes a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor; a first electrode of the third transistor is connected to the second power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the first power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the second input terminal.

In an embodiment, the reset sub-circuit includes a second transistor; and a first electrode of the second transistor is connected to a control electrode of the second transistor and a reset signal terminal, and a second electrode of the second transistor is connected to the first node.

In a second aspect, the embodiment of the present disclosure provides a pixel driving circuit, including a driving transistor and the flip-flop circuit of any one of the above embodiments; the output terminal of the flip-flop circuit is connected to a control electrode of the driving transistor.

DETAIL DESCRIPTION OF EMBODIMENTS

Figure 1:
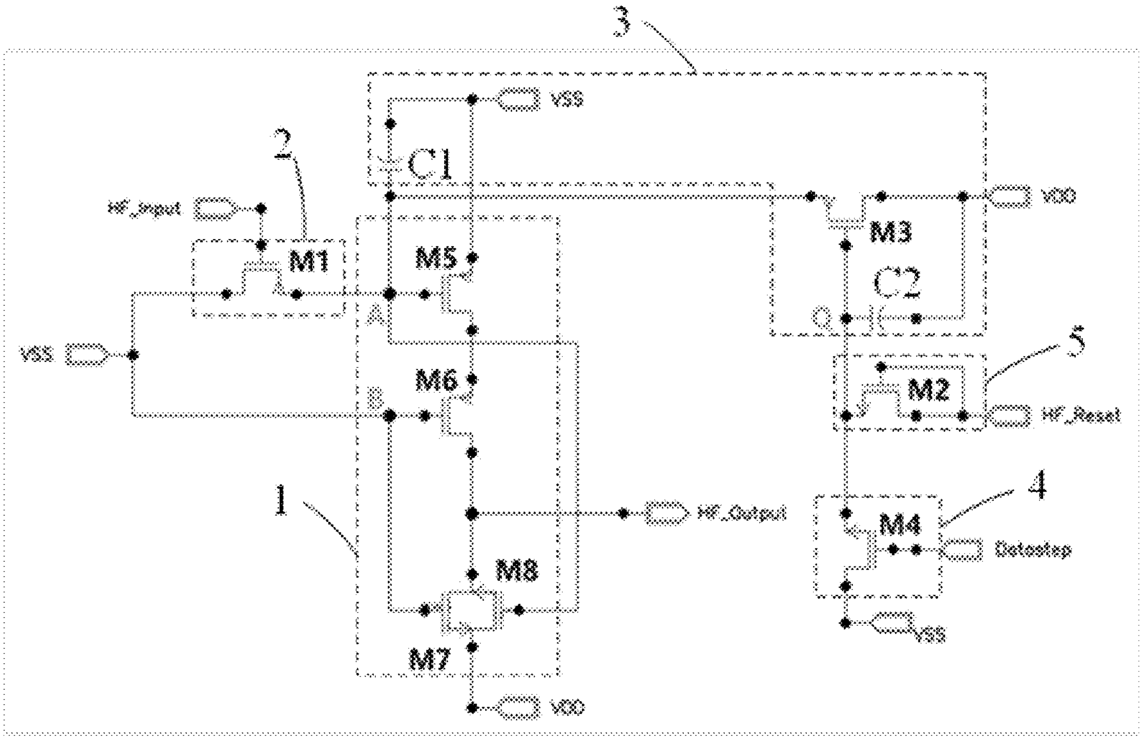
FIG. 1 is a schematic diagram of a flip-flop circuit in a first example of an embodiment of the present disclosure.

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Before describing the embodiments of the present disclosure, it should be noted that in the embodiments of the present disclosure, (a magnitude of) a first power supply voltage is greater than (a magnitude of) a second power supply voltage. For example: (a magnitude of) the first power supply voltage is 8V and (a magnitude of) the second power supply voltage is −8V. That is, the first power supply voltage is a high-level signal with respect to the second power supply voltage, and the second power supply voltage is a low-level signal with respect to the first power supply voltage. However, a first power supply voltage terminal and a second power supply voltage terminal in the embodiments described below are configured to provide the first power supply voltage and the second power supply voltage, respectively. An input control signal and a reset signal in the embodiments described below are both high frequency scan signals.

In a first aspect, an embodiment of the present disclosure provides a flip-flop circuit, including an input sub-circuit, an AND gate, a control sub-circuit, a duty ratio adjustment sub-circuit, and a reset sub-circuit. The AND gate includes a first input terminal, a second input terminal and an output terminal, and is configured to control a clock signal output from the output terminal based on input signals of the first input terminal and the second input terminal, and each clock cycle of the clock signal jumps between a first power supply voltage and a second power supply voltage. The input sub-circuit is configured to write the second power supply voltage into the first input terminal and/or the second input terminal in response to an input control signal to control the output terminal to output the first power supply voltage or the second power supply voltage. The control sub-circuit is configured to control a potential at a first node through the second power supply voltage in response to a data voltage control signal. The first node is a connection node between the control sub-circuit and the duty ratio adjustment sub-circuit. The duty ratio adjustment sub-circuit is configured to control the output terminal to output the first power supply voltage in response to a potential at the first node to adjust a duty ratio of the clock signal. The reset sub-circuit is configured to respond to a reset signal and reset the potential at the first node through the reset signal.

The flip-flop circuit provided by the embodiment of the present disclosure is provided with the duty ratio adjustment sub-circuit, which may generate the clock signal with the adjustable duty ratio. In this case, the flip-flop circuit may be applied to the pixel driving circuit, and a turn-on time of a driving transistor is controlled based on the clock signal generated by the flip-flop circuit, thereby controlling a brightness of a light emitting device.

Alternatively, in the embodiment of the present disclosure, the input sub-circuit may be configured to write the first power supply voltage into the first input terminal and/or the second input terminal in response to the input control signal to control the output terminal to output the first power supply voltage or the second power supply voltage. The control sub-circuit is configured to control the potential at the first node through the second power supply voltage in response to the data voltage control signal. The first node is a connection node connected between the control sub-circuit and the duty ratio adjustment sub-circuit. The duty ratio adjustment sub-circuit is configured to control the output terminal to output the first power supply voltage in response to the potential at the first node to adjust a duty ratio of the clock signal. The reset sub-circuit is configured to respond to a reset signal and reset the potential at the first node through the reset signal.

In order to better understand the flip-flop circuit in the embodiment of the present disclosure, the flip-flop circuit is specifically described below with reference to specific examples.

In a first example, FIG. 1 is a schematic diagram of a flip-flop circuit in a first example of an embodiment of the present disclosure. As shown in FIG. 1, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a second power supply voltage terminal VSS through the input sub-circuit 2, and a second input terminal B of the AND gate 1 is directly connected to the second power supply voltage terminal VSS. The reset sub-circuit 5 is connected to the first node Q.

Referring to FIG. 1, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics (i.e., have the same conductivity type or have the same carrier type in their channels), and switching characteristics (i.e., conductivity type or carrier type in the channel) of the second transistor M2 are opposite to the switching characteristics of the first transistor M1, but are the same as those of the fourth transistor M4, the seventh transistor M7, and the eighth transistor M8. In this example, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 1, a first electrode of the first transistor M1 is connected to the second power supply voltage terminal VSS, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the first example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the first example is described. With continued reference to FIG. 1, a step of generating each clock cycle signal of a clock signal by using the flip-flop circuit in the first example includes:

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the first input terminal A through the first transistor M1. Therefore, the fifth transistor M5 is turned on, and the eighth transistor M8 is turned off. The control electrode of the sixth transistor M6 is connected to the second power supply voltage terminal VSS, so that the sixth transistor M6 is turned on. At this time, the output terminal HF_Output outputs the second power supply voltage written by the second power supply voltage terminal VSS, that is, a low-level signal. At the same time, the first node Q is discharged through a data voltage control signal written by the data voltage control signal terminal, and a turn-on degree of the fourth transistor M4 (i.e., a degree to which the fourth transistor M4 is turned on) is controlled through a magnitude of the written data voltage control signal, thereby controlling a discharging speed for the first node Q (i.e., a speed for discharging the first node Q).

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the first power supply voltage, that is, a high-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by adjusting the magnitudes of the data voltage control signal.

Figure 2:
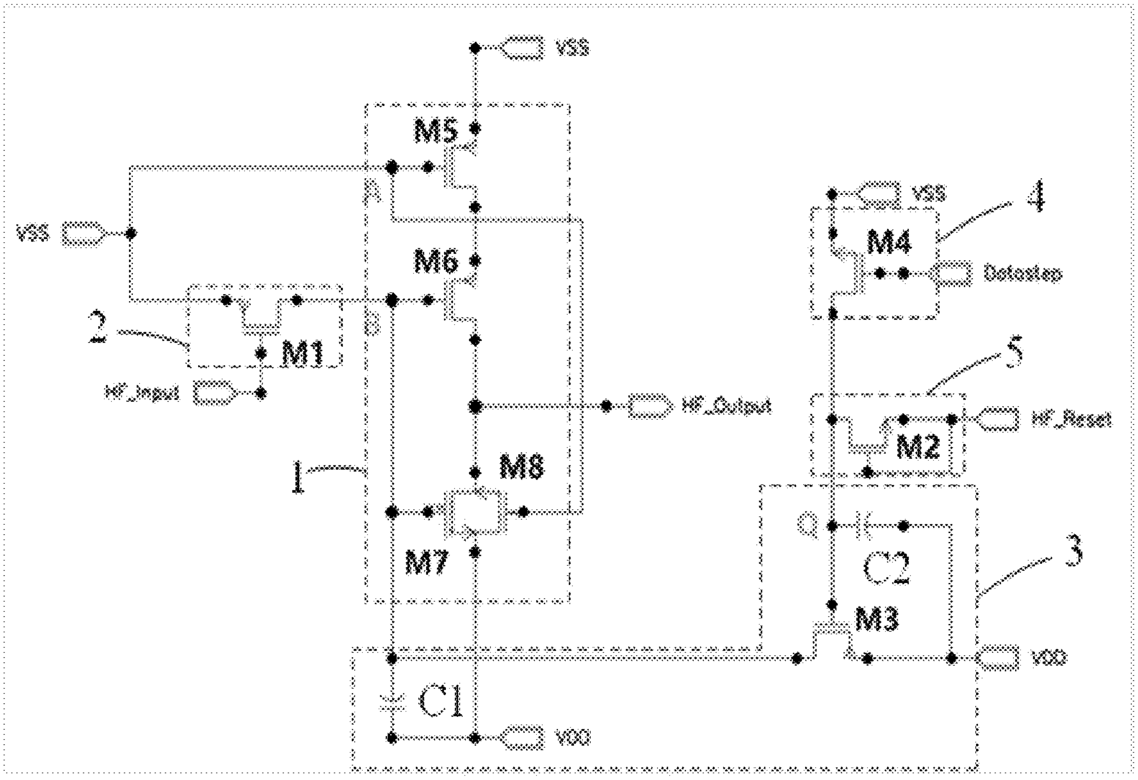
FIG. 2 is a schematic diagram of a flip-flop circuit in a second example of an embodiment of the present disclosure.

In a second example, FIG. 2 is a schematic diagram of a flip-flop circuit in a second example of an embodiment of the present disclosure. As shown in FIG. 2, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a second power supply voltage terminal VSS through the input sub-circuit 2, and a first input terminal A of the AND gate 1 is directly connected to the second power supply voltage terminal VSS. The reset sub-circuit 5 is connected to the first node Q.

Referring to FIG. 2, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics, and switching characteristics (i.e., conductivity type or carrier type in channel) of the second transistor M2 are opposite to the switching characteristics of the first transistor M1, but are the same as those of the fourth transistor M4, the seventh transistor M7, and the eighth transistor M8. In this embodiment, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 2, a first electrode of the first transistor M1 is connected to the second power supply voltage terminal VSS, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the first power supply voltage terminal VDD. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. A first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the second example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the second example is described. With continued reference to FIG. 2, a step of generating each clock cycle signal of a clock signal by using the flip-flop circuit in the second example includes:

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the second input terminal B through the first transistor M1. Therefore, the sixth transistor M6 is turned on and the seventh transistor M7 is turned off. The control electrode of the fifth transistor M5 is connected to the second power supply voltage terminal VSS, so that the fifth transistor M5 is turned on. At this time, the output terminal HF_Output outputs the second power supply voltage written by the second power supply voltage terminal VSS, that is, a low-level signal. At the same time, the first node Q is discharged through a data voltage control signal written by the data voltage control signal terminal, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the second input terminal B, and therefore, the sixth transistor M6 is turned off and the seventh transistor M7 is turned on. The output terminal HF_Output outputs the first power supply voltage, that is, a high-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the second input terminal B is kept at a high level by the first capacitor C1, the sixth transistor M6 is still turned off, the seventh transistor M7 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by adjusting the magnitudes of the data voltage control signal.

Figure 3:
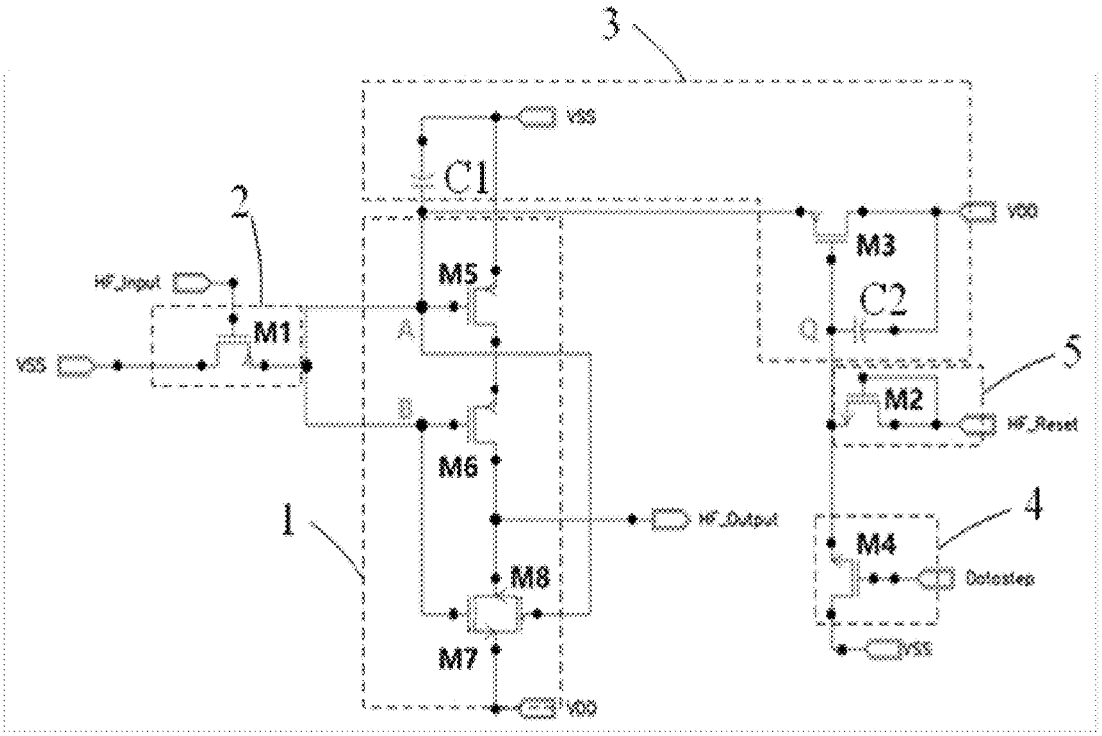
FIG. 3 is a schematic diagram of a flip-flop circuit in a third example of an embodiment of the present disclosure.

In a third example, FIG. 3 is a schematic diagram of a flip-flop circuit in a third example of an embodiment of the present disclosure. As shown in FIG. 3, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, and a first input terminal A and a second input terminal B of the AND gate 1 are connected to a second power supply voltage terminal VSS through the input sub-circuit 2. The reset sub-circuit 5 is connected to the first node Q.

Referring to FIG. 3, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics, and switching characteristics of the second transistor M2 are opposite to the switching characteristics (i.e., conductivity type or carrier type in channel) of the first transistor M1, but are the same as those of the fourth transistor M4, the seventh transistor M7, and the eighth transistor M8. In this embodiment, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 3, a first electrode of the first transistor M1 is connected to the second power supply voltage terminal VSS, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the second power supply voltage terminal VSS. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the third example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the third example is described. With continued reference to FIG. 3, a step of generating each clock cycle signal of a clock signal by using the flip-flop circuit in the third example includes:

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the first input terminal A and the second input terminal B through the first transistor M1. Therefore, the fifth transistor M5 and the sixth transistor M6 are turned on, and the seventh transistor M7 and the eighth transistor M8 are turned off. At this time, the output terminal HF_Output outputs the second power supply voltage written by the second power supply voltage terminal VSS, that is, a low-level signal. At the same time, the first node Q is discharged through a data voltage control signal written by the data voltage control signal terminal, and a turn-on degree of the fourth transistor M4 is controlled through a magnitude of the written data voltage control signal, thereby controlling a discharging speed for the first node Q (i.e., a degree, to which the fourth transistor M4 is turned on, is controlled by a magnitude of the written data voltage control signal, thereby controlling a speed to discharge the first node Q).

In a third stage, after a duration t elapses, when the first node Q is discharged so that the potential at the first node Q minus the first power supply voltage is less than a threshold voltage of the third transistor M3, that is, $VQ-VDD<Vth$, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the first power supply voltage, that is, a high-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until $VQ-VDD<Vth$, and the clock signals with different duty ratios may be obtained by adjusting the magnitudes of the data voltage control signal.

Figure 4:
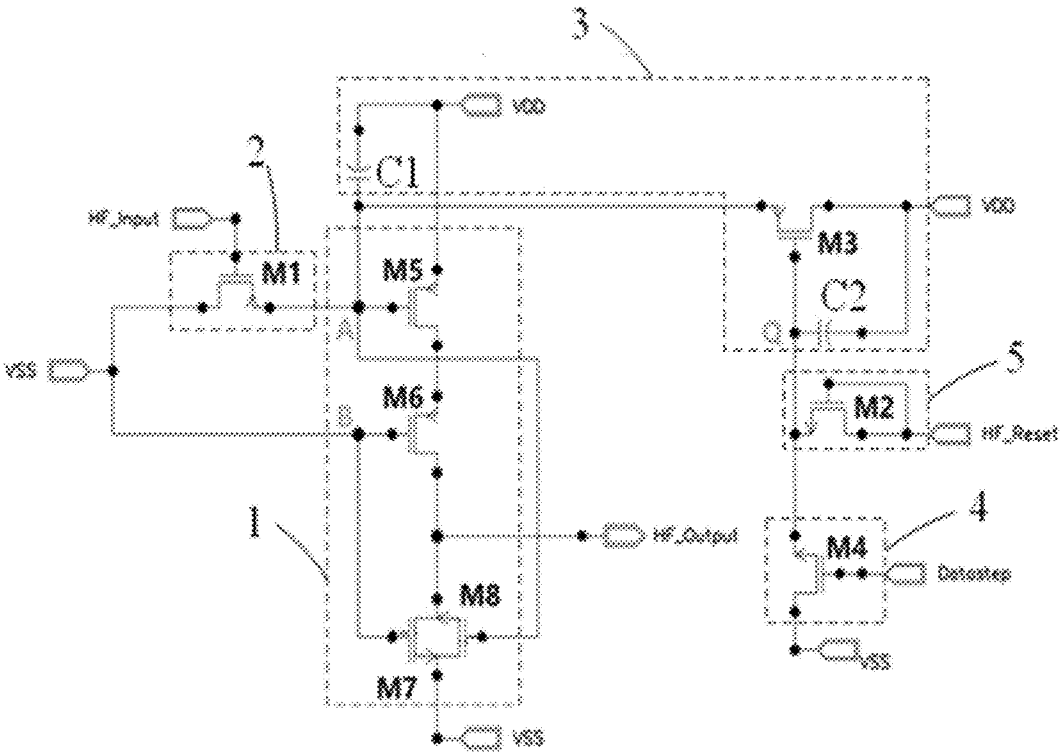
FIG. 4 is a schematic diagram of a flip-flop circuit in a fourth example of an embodiment of the present disclosure.

In a fourth example, FIG. 4 is a schematic diagram of a flip-flop circuit in a fourth example of an embodiment of the present disclosure. As shown in FIG. 4, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a second power supply voltage terminal VSS through the input sub-circuit 2, and a second input terminal B of the AND gate 1 is directly connected to the second power supply voltage terminal VSS. The reset sub-circuit 5 is connected to the first node Q.

Referring to FIG. 4, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics, and switching characteristics of the second transistor M2 are opposite to the switching characteristics of the first transistor M1, but are the same as those of the fourth transistor M4, the seventh transistor M7, and the eighth transistor M8. In this embodiment, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 4, a first electrode of the first transistor M1 is connected to the second power supply voltage terminal VSS, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the fourth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the fourth example is described. With continued reference to FIG. 4, a step of generating each clock cycle signal of a clock signal by using the flip-flop circuit in the fourth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the first input terminal A through the first transistor M1. Therefore, the fifth transistor M5 is turned on, and the eighth transistor M8 is turned off. The control electrode of the sixth transistor M6 is connected to the second power supply voltage terminal VSS, so that the sixth transistor M6 is turned on. At this time, the output terminal HF_Output outputs the first power supply voltage written by the first power supply voltage terminal VDD, that is, a high-level signal. At the same time, the first node Q is discharged through a data voltage control signal written by the data voltage control signal terminal, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, $VQ-VDD<Vth$, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the second power supply voltage, that is, a low-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by adjusting the magnitudes of the data voltage control signal.

Figure 5:
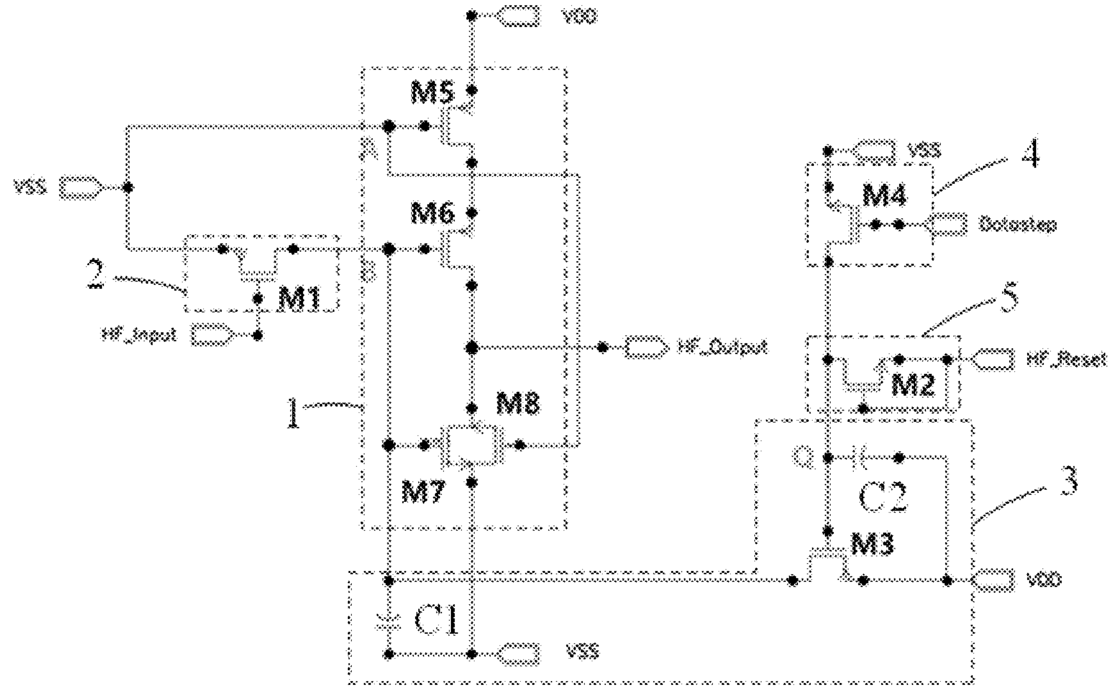
FIG. 5 is a schematic diagram of a flip-flop circuit in a fifth example of an embodiment of the present disclosure.

In a fifth example, FIG. 5 is a schematic diagram of a flip-flop circuit in a fifth example of an embodiment of the present disclosure. As shown in FIG. 5, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a second power supply voltage terminal VSS through the input sub-circuit 2, and a first input terminal A of the AND gate 1 is directly connected to the second power supply voltage terminal VSS. The reset sub-circuit 5 is connected to the first node Q.

Referring to FIG. 5, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics, and switching characteristics of the second transistor M2 are opposite to the switching characteristics of the first transistor M1, but are the same as those of the fourth transistor M4, the seventh transistor M7, and the eighth transistor M8. In this example, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 5, a first electrode of the first transistor M1 is connected to the second power supply voltage terminal VSS, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the second power supply voltage terminal VSS. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. A first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the fifth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the fifth example is described. With continued reference to FIG. 5, a step of generating each clock cycle signal of a clock signal by using the flip-flop circuit in the fifth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the first input terminal A through the first transistor M1. Therefore, the sixth transistor M6 is turned on and the seventh transistor M7 is turned off. The control electrode of the fifth transistor M5 is connected to the second power supply voltage terminal VSS, so that the fifth transistor M5 is turned on. At this time, the output terminal HF_Output outputs the first power supply voltage written by the first power supply voltage terminal VDD, that is, a high-level signal. At the same time, the first node Q is discharged through a data voltage control signal written by the data voltage control signal terminal, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the second input terminal B, and therefore, the sixth transistor M6 is turned off and the seventh transistor M7 is turned on. The output terminal HF_Output outputs the second power supply voltage, that is, a low-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the second input terminal B is kept at a high level by the first capacitor C1, the fifth transistor M5 is still turned off, the seventh transistor M7 is still turned on, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by adjusting the magnitudes of the data voltage control signal.

Figure 6:
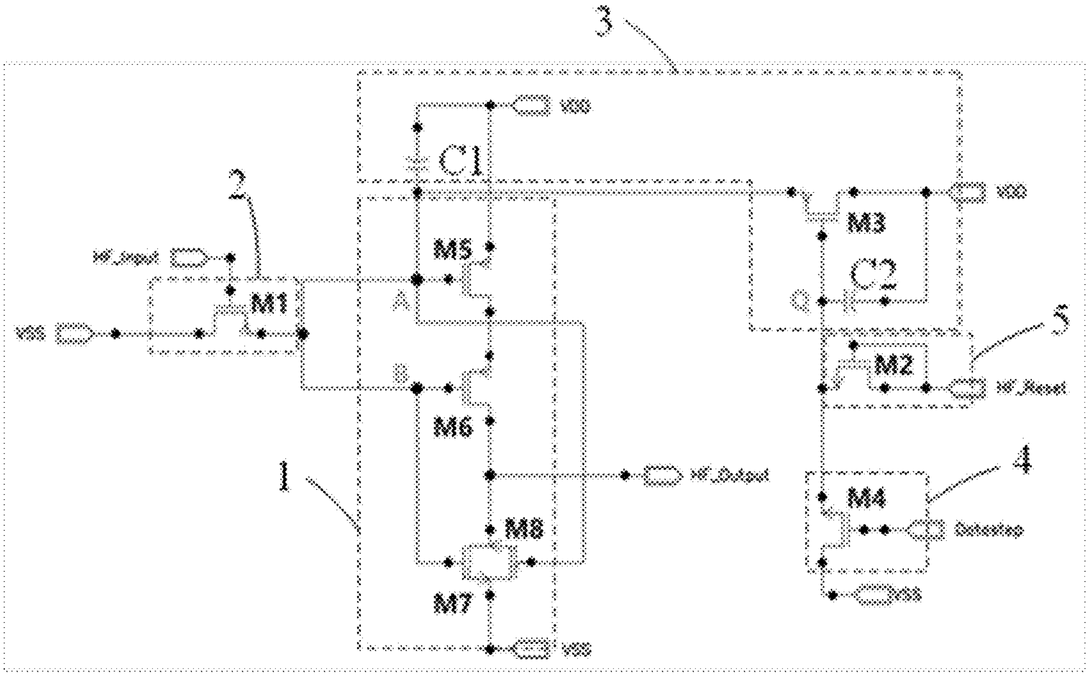
FIG. 6 is a schematic diagram of a flip-flop circuit in a sixth example of an embodiment of the present disclosure.

In a sixth example, FIG. 6 is a schematic diagram of a flip-flop circuit in a sixth example of an embodiment of the present disclosure. As shown in FIG. 6, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, and a first input terminal A and a second input terminal B of the AND gate 1 are connected to a second power supply voltage terminal VSS through the input sub-circuit 2. The reset sub-circuit 5 is connected to the first node Q.

Referring to FIG. 6, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the fifth transistor M5, and the sixth transistor M6 have the same switching characteristics, and switching characteristics of the second transistor M2 are opposite to the switching characteristics of the first transistor M1, but are the same as those of the fourth transistor M4, the seventh transistor M7, and the eighth transistor M8. In this embodiment, as an example, the first transistor M1, the third transistor M3, the fifth transistor M5, and the sixth transistor M6 are P-type transistors, and the second transistor M2, the fourth transistor M4, the seventh transistor M7, and the eighth transistor M8 are N-type transistors.

Specifically, with reference to FIG. 6, a first electrode of the first transistor M1 is connected to the second power supply voltage terminal VSS, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the second power supply voltage terminal VSS, a second electrode of the fourth transistor M4 is connected to the first node Q, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the sixth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the sixth example is described. With continued reference to FIG. 6, a step of generating each clock cycle signal of a clock signal by using the flip-flop circuit in the sixth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off. A low-level signal is input by the input signal control terminal HF_Input, so that the first transistor M1 is turned on, a second power supply voltage written by the second power supply voltage terminal VSS is written into the first input terminal A and the second input terminal B through the first transistor M1. Therefore, the fifth transistor M5 and the sixth transistor M6 are turned on, and the seventh transistor M7 and the eighth transistor M8 are turned off. At this time, the output terminal HF_Output outputs the first power supply voltage written by the first power supply voltage terminal VDD, that is, a high-level signal. At the same time, the first node Q is discharged through a data voltage control signal written by the data voltage control signal terminal, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the second power supply voltage, that is, a low-level signal.

In a fourth stage, that is, before the cycle ends, the reset signal written by the reset signal terminal HF_Reset is a high-level signal, so that the second transistor M2 is turned on, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by changing the magnitudes of the data voltage control signal.

Figure 7:
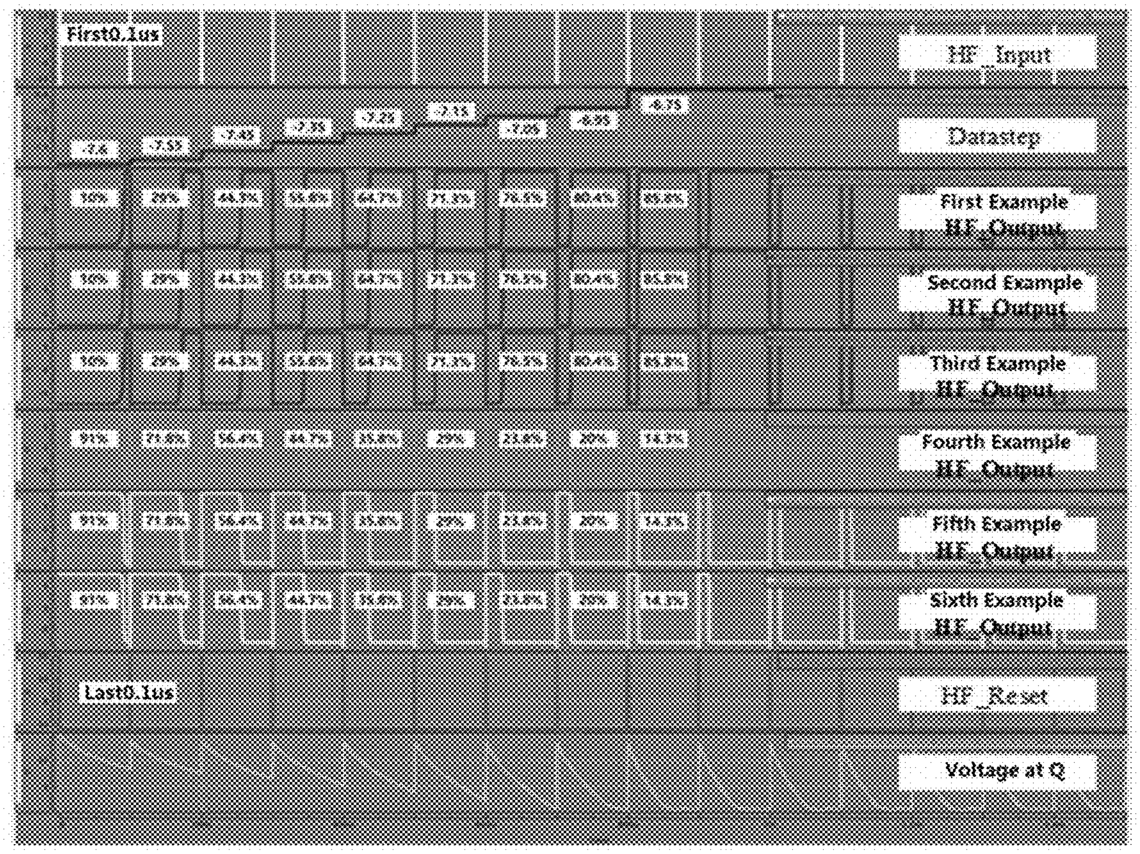
FIG. 7 is a schematic diagram showing simulation results of the flip-flop circuit in each of the first example to the sixth example.

Each transistor of the flip-flop circuit in each of the first example to the sixth example has a width-to-length ratio W/L=5/5. Referring to FIG. 7, it can be seen from the schematic diagram showing simulation results of the flip-flop circuit in each of the first example to the sixth example that with the data voltage control signal Datastep=[−7.6V, −7.55V, −7.45V, −7.35V, −7.25V, −7.15V, −7.05V, −6.95V, −6.75V], a corresponding generated clock cycle has the following duty ratio (a high voltage/a cycle H): [10%, 29%, 44.3%, 55.8%, 64.7%, 71.3%, 76.5%, 80.4%, 85.8%] in each of the first example to the third example; [91%, 71.8%, 56.4%, 44.7%, 35.8%, 29%, 23.8%, 20%, 14.3%] in each of the fourth example to the sixth example.

Figure 8:
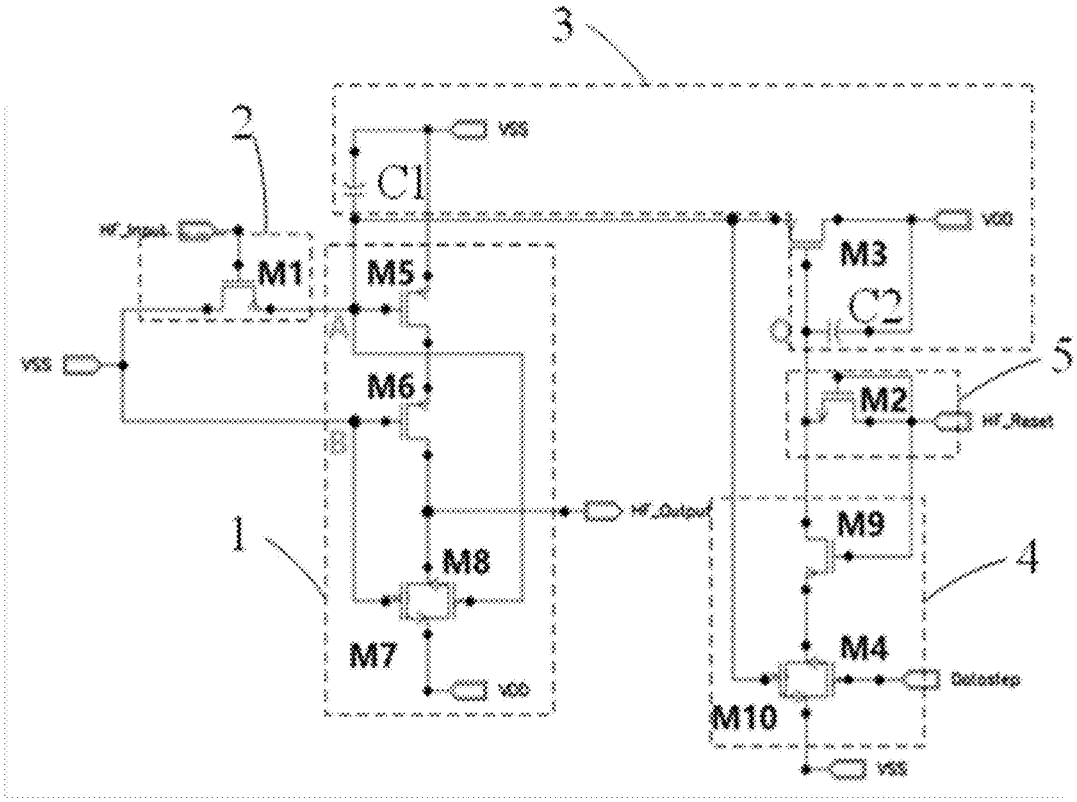
FIG. 8 is a schematic diagram of a flip-flop circuit in a seventh example of an embodiment of the present disclosure.

In a seventh example, FIG. 8 is a schematic diagram of a flip-flop circuit in a seventh example of an embodiment of the present disclosure. As shown in FIG. 8, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a second power supply voltage terminal VSS through the input sub-circuit 2, and a second input terminal B of the AND gate 1 is directly connected to the second power supply voltage terminal VSS. The reset sub-circuit 5 is connected to the first node Q.

Referring to FIG. 8, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this example, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with reference to FIG. 8, a first electrode of the first transistor M1 is connected to the second power supply voltage terminal VSS, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the seventh example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal −0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the seventh example is described. With continued reference to FIG. 8, a step of generating each clock cycle signal of a clock signal by using the flip-flop circuit in the seventh example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the first input terminal A through the first transistor M1. Therefore, the fifth transistor M5 is turned on, and the eighth transistor M8 is turned off. The control electrode of the sixth transistor M6 is connected to the second power supply voltage terminal VSS, so that the sixth transistor M6 is turned on. At this time, the output terminal HF_Output outputs the second power supply voltage written by the second power supply voltage terminal VSS, that is, a low-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the first power supply voltage, that is, a high-level signal. At the same time, the tenth transistor M10 is turned on, which may increase the discharging speed for the first node Q, and improve a rise time Tr of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by adjusting the magnitudes of the data voltage control signal.

Figure 9:
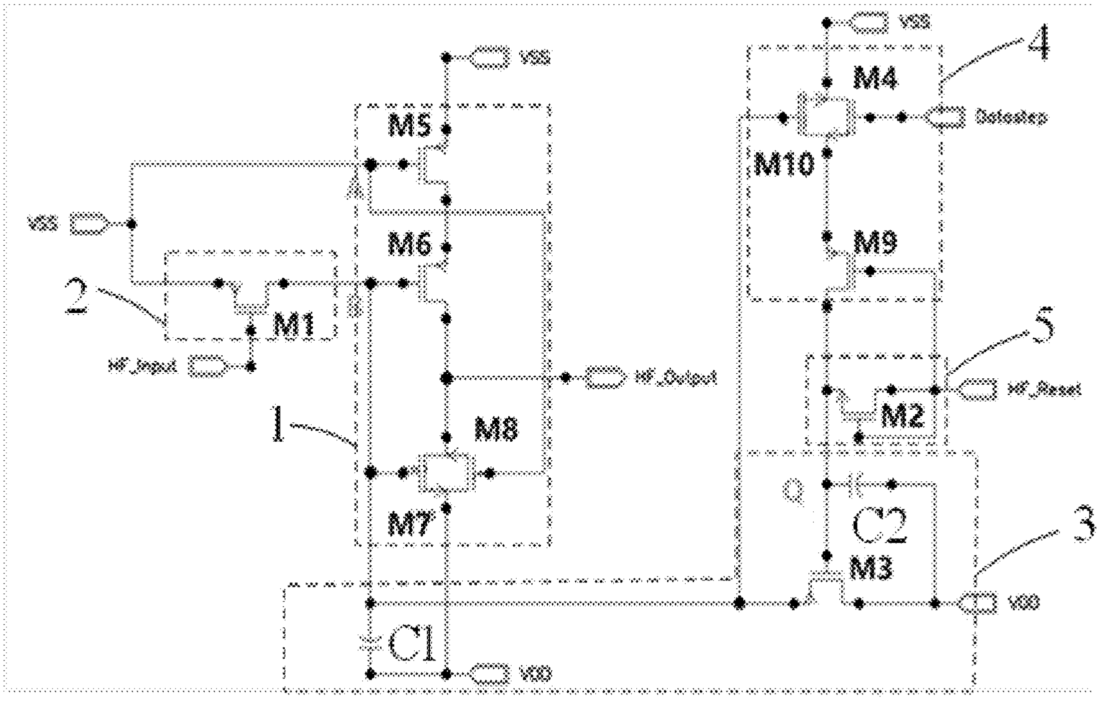
FIG. 9 is a schematic diagram of a flip-flop circuit in an eighth example of an embodiment of the present disclosure.

In an eighth example, FIG. 9 is a schematic diagram of a flip-flop circuit in an eighth example of an embodiment of the present disclosure. As shown in FIG. 9, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a second power supply voltage terminal VSS through the input sub-circuit 2, and a first input terminal A of the AND gate 1 is directly connected to the second power supply voltage terminal VSS. The reset sub-circuit 5 is connected to the first node Q.

Referring to FIG. 9, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this example, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with continued reference to FIG. 9, a first electrode of the first transistor M1 is connected to the second power supply voltage terminal VSS, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the first power supply voltage terminal VDD. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. A first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the second input terminal B.

A method for generating a clock signal by the flip-flop circuit in the eighth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the eighth example is described. With continued reference to FIG. 9, a step of generating each clock cycle signal of a clock signal by using the flip-flop circuit in the eighth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the second input terminal B through the first transistor M1. Therefore, the sixth transistor M6 is turned on and the seventh transistor M7 is turned off. The control electrode of the fifth transistor M5 is connected to the second power supply voltage terminal VSS, so that the fifth transistor M5 is turned on. At this time, the output terminal HF_Output outputs the second power supply voltage written by the second power supply voltage terminal VSS, that is, a low-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, $V_Q - V_{DD} < V_{th}$, the third transistor M3 is turned on, a first power supply voltage written by the first power supply voltage terminal VDD is written to the second input terminal B, and therefore, the sixth transistor M6 is turned off and the seventh transistor M7 is turned on. The output terminal HF_Output outputs the first power supply voltage, that is, a high-level signal. At the same time, the tenth transistor M10 is turned on, which may increase the discharging speed for the first node Q, and improve Tr of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the second input terminal B is kept at a high level by the first capacitor C1, the sixth transistor M6 is still turned off, the seventh transistor M7 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until $V_Q - V_{DD} < V_{th}$, and the clock signals with different duty ratios may be obtained by adjusting the magnitudes of the data voltage control signal.

Figure 10:
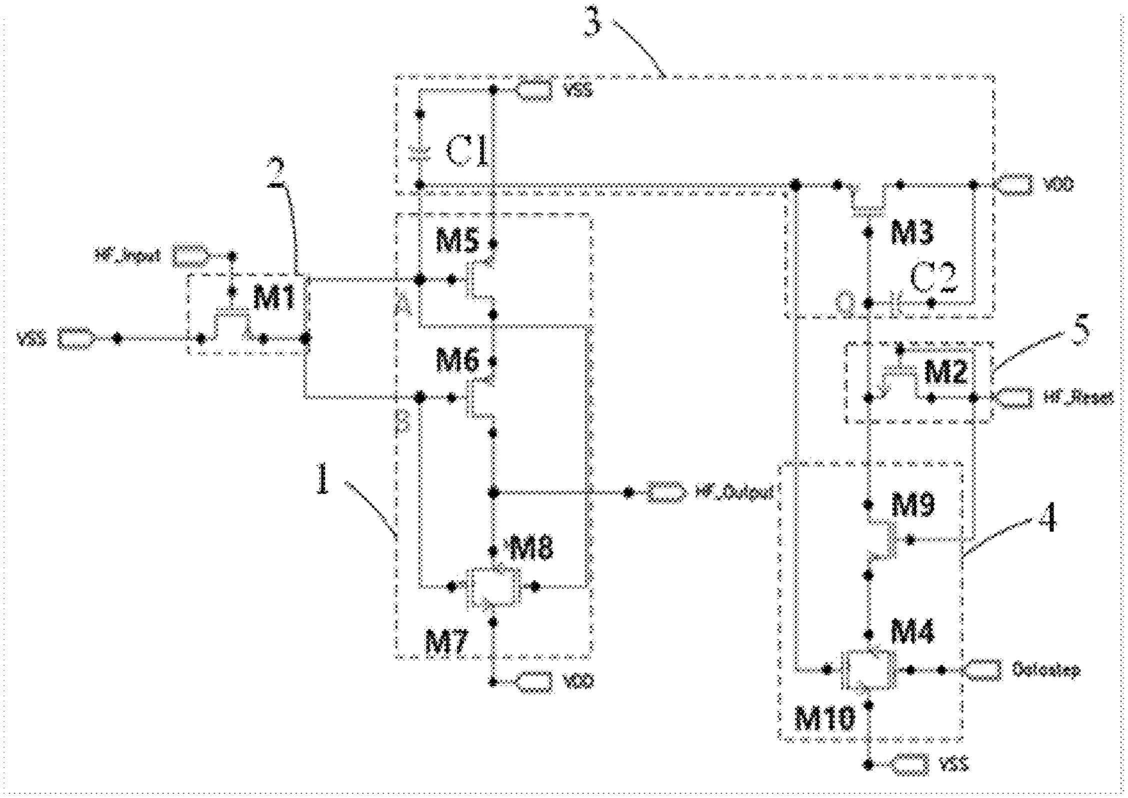
FIG. 10 is a schematic diagram of a flip-flop circuit in a ninth example of an embodiment of the present disclosure.

In a ninth example, FIG. 10 is a schematic diagram of a flip-flop circuit in a ninth example of an embodiment of the present disclosure. As shown in FIG. 10, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, and a first input terminal A and a second input terminal B of the AND gate 1 are connected to a second power supply voltage terminal VSS through the input sub-circuit 2. The reset sub-circuit 5 is connected to the first node Q.

Referring to FIG. 10, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this embodiment, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with reference to FIG. 10, a first electrode of the first transistor M1 is connected to the second power supply voltage terminal VSS, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the ninth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the ninth example is described. With continued reference to FIG. 10, a step of generating each clock cycle signal of a clock signal by using the flip-flop circuit in the ninth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the first input terminal A and the second input terminal B through the first transistor M1. Therefore, the fifth transistor M5 and the sixth transistor M6 are turned on, and the seventh transistor M7 and the eighth transistor M8 are turned off. At this time, the output terminal HF_Output outputs the second power supply voltage written by the second power supply voltage terminal VSS, that is, a low-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, $VQ-VDD<Vth$, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the first power supply voltage, that is, a high-level signal. At the same time, the tenth transistor M10 is turned on, which may increase the discharging speed for the first node Q, and improve Tr of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until $VQ-VDD<Vth$, and the clock signals with different duty ratios may be obtained by adjusting the magnitudes of the data voltage control signal.

Figure 11:
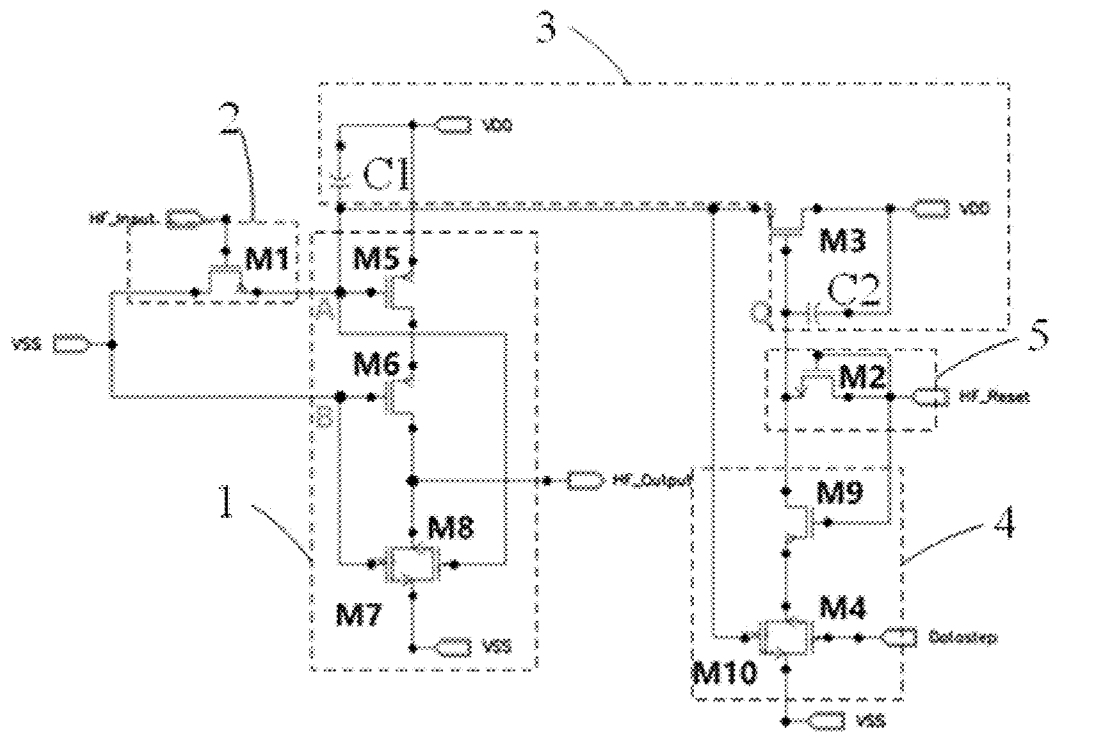
FIG. 11 is a schematic diagram of a flip-flop circuit in a tenth example of an embodiment of the present disclosure.

In a tenth example, FIG. 11 is a schematic diagram of a flip-flop circuit in a tenth example of an embodiment of the present disclosure. As shown in FIG. 11, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a second power supply voltage terminal VSS through the input sub-circuit 2, and a second input terminal B of the AND gate 1 is directly connected to the second power supply voltage terminal VSS. The reset sub-circuit 5 is connected to the first node Q.

Referring to FIG. 11, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this embodiment, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with reference to FIG. 11, a first electrode of the first transistor M1 is connected to the second power supply voltage terminal VSS, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the tenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the tenth example is described. With continued reference to FIG. 11, a step of generating each clock cycle signal of a clock signal by using the flip-flop circuit in the tenth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the first input terminal A through the first transistor M1. Therefore, the fifth transistor M5 is turned on, and the eighth transistor M8 is turned off. The control electrode of the sixth transistor M6 is connected to the second power supply voltage terminal VSS, so that the sixth transistor M6 is turned on. At this time, the output terminal HF_Output outputs the first power supply voltage written by the first power supply voltage terminal VDD, that is, a high-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, $V_Q-V_{DD}<V_{th}$, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the second power supply voltage, that is, a low-level signal. At the same time, the tenth transistor M10 is turned on, which may increase the discharging speed for the first node Q, and improve Tf of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by using the data voltage control signals with different magnitudes, respectively.

Figure 12:
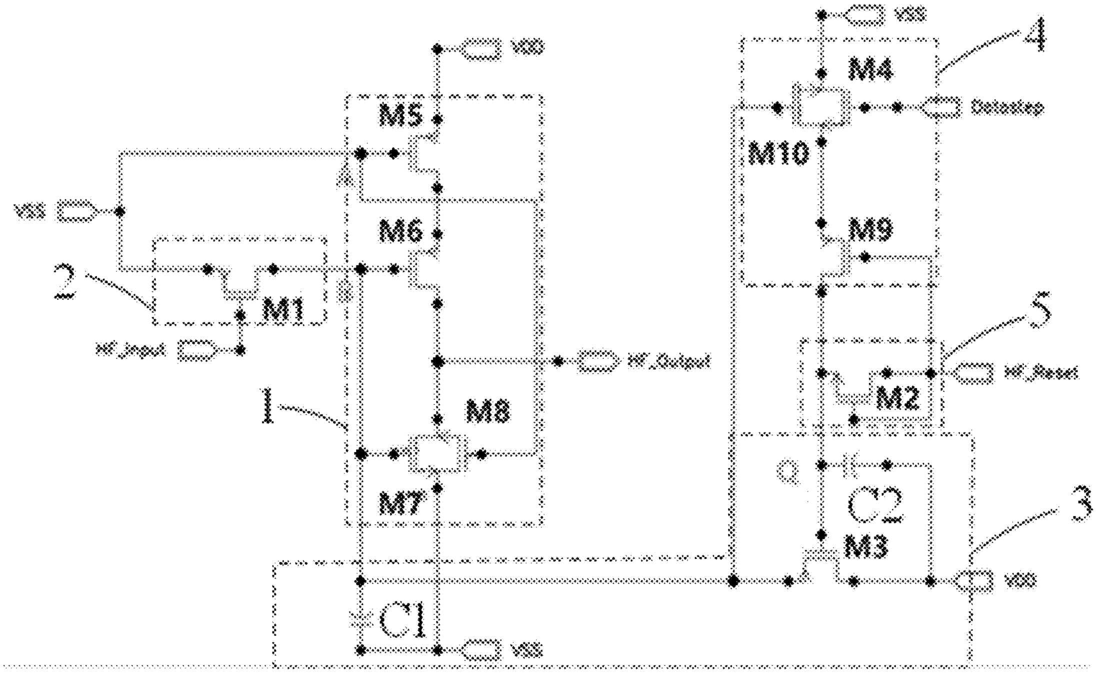
FIG. 12 is a schematic diagram of a flip-flop circuit in an eleventh example of an embodiment of the present disclosure.

In an eleventh example, FIG. 12 is a schematic diagram of a flip-flop circuit in an eleventh example of an embodiment of the present disclosure. As shown in FIG. 12, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a second power supply voltage terminal VSS through the input sub-circuit 2, and a first input terminal A of the AND gate 1 is directly connected to the second power supply voltage terminal VSS. The reset sub-circuit 5 is connected to the first node Q.

Referring to FIG. 12, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this embodiment, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with reference to FIG. 12, a first electrode of the first transistor M1 is connected to the second power supply voltage terminal VSS, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the second power supply voltage terminal VSS. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. A first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the second input terminal B.

A method for generating a clock signal by the flip-flop circuit in the eleventh example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the eleventh example is described. With continued reference to FIG. 12, a step of generating each clock cycle signal of a clock signal by using the flip-flop circuit in the eleventh example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the second input terminal B through the first transistor M1. Therefore, the sixth transistor M6 is turned on and the seventh transistor M7 is turned off. The control electrode of the fifth transistor M5 is connected to the second power supply voltage terminal VSS, so that the fifth transistor M5 is turned on. At this time, the output terminal HF_Output outputs the first power supply voltage written by the first power supply voltage terminal VDD, that is, a high-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, $VQ-VDD<Vth$, the third transistor M3 is turned on, a first power supply voltage written by the first power supply voltage terminal VDD is written to the second input terminal B, and therefore, the sixth transistor M6 is turned off and the seventh transistor M7 is turned on. The output terminal HF_Output outputs the second power supply voltage, that is, a low-level signal. At the same time, the tenth transistor M10 is turned on, which may increase the discharging speed for the first node Q, and improve Tf of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the second input terminal B is kept at a high level by the first capacitor C1, the sixth transistor M6 is still turned off, the seventh transistor M7 is still turned on, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the discharging speed for the first node Q, the control electrode of the third transistor M3 is discharged by the fourth transistor M4 for a duration (that is, the time when the output terminal HF_Output of the AND gate 1 outputs a low-level signal) until $VQ-VDD<Vth$, and the clock signals with different duty ratios may be obtained by using the data voltage control signals with different magnitudes, respectively.

Figure 13:
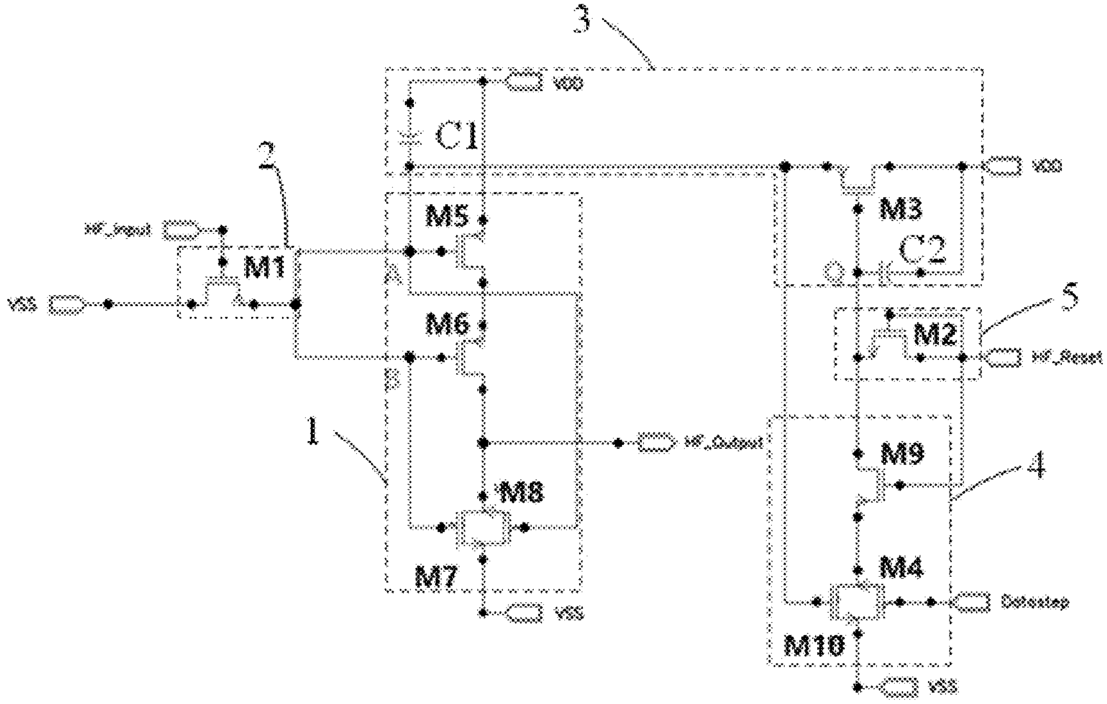
FIG. 13 is a schematic diagram of a flip-flop circuit in a twelfth example of an embodiment of the present disclosure.

In a twelfth example, FIG. 13 is a schematic diagram of a flip-flop circuit in a twelfth example of an embodiment of the present disclosure. As shown in FIG. 13, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, and a first input terminal A and a second input terminal B of the AND gate 1 are connected to a second power supply voltage terminal VSS through the input sub-circuit 2. The reset sub-circuit 5 is connected to the first node Q.

Referring to FIG. 13, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the fifth transistor M5, the sixth transistor M6 and the ninth transistor M9 have the same switching characteristics, and switching characteristics of the second transistor M2 are opposite to the switching characteristics of the first transistor M1, but are the same as those of the fourth transistor M4, the seventh transistor M7, the eighth transistor M8 and the tenth transistor M10. In this embodiment, as an example, the first transistor M1, the third transistor M3, the fifth transistor M5, the sixth transistor M6 and the ninth transistor M9 are P-type transistors, and the second transistor M2, the fourth transistor M4, the seventh transistor M7, the eighth transistor M8 and the tenth transistor M10 are N-type transistors.

Specifically, with reference to FIG. 13, a first electrode of the first transistor M1 is connected to the second power supply voltage terminal VSS, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to a first power supply voltage terminal VDD and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the second power supply voltage terminal VSS and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the twelfth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 20V, a low-level signal is −12V, a cycle is H=100 μs, and a duty ratio is a low-level signal/a high-level signal=99.9 μs/0.1 μs; a capacitance of the first capacitor C1 is 20 fF and a capacitance of the second capacitor C2 is 2 pF.

Next, an operation of the flip-flop circuit in the twelfth example is described. With continued reference to FIG. 13, a step of generating each clock cycle signal of a clock signal by using the flip-flop circuit in the twelfth example includes the following stages.

In a first stage, i.e., an initial stage of the clock cycle, the reset signal written into the reset signal terminal HF_Reset is a high-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a low-level signal, so that the second transistor M2 is turned off and the ninth transistor M9 is turned on. A low-level signal is input by the input signal control terminal HF_Input, so that the first transistor M1 is turned on, a second power supply voltage written by the second power supply voltage terminal VSS is written into the first input terminal A and the second input terminal B through the first transistor M1. Therefore, the fifth transistor M5 and the sixth transistor M6 are turned on, and the seventh transistor M7 and the eighth transistor M8 are turned off. At this time, the output terminal HF_Output outputs the first power supply voltage written by the first power supply voltage terminal VDD, that is, a high-level signal. At the same time, the ninth transistor M9 is turned on, so that the first node Q is discharged, and a turn-on degree of the fourth transistor M4 is controlled through a magnitude of the written data voltage control signal, thereby controlling a discharging speed for the first node Q.

In a third stage, after a duration t elapses, when the first node Q is discharged so that the potential at the first node Q minus the first power supply voltage is less than a threshold voltage of the third transistor M3, that is, VQ−VDD<Vth, the third transistor M3 is turned on, a first power supply voltage written by the first power supply voltage terminal VDD is written to the first input terminal A, and therefore, the fifth transistor M5 is turned off, and the eighth transistor M8 is turned on. The output terminal HF_Output outputs the second power supply voltage, that is, a low-level signal. At the same time, the tenth transistor M10 is turned on, which may increase the discharging speed for the first node Q, and improve Tf of the output signal of the output terminal HF_Output.

In a fourth stage, that is, before the cycle ends, the reset signal written by the reset signal terminal HF_Reset is a high-level signal, so that the second transistor M2 is turned on, the ninth transistor M9 is turned off, the potential at the first node Q is reset to 20V, the third transistor M3 is turned off, the first input terminal A is kept at a high level by the first capacitor C1, the fifth transistor M5 is still turned off, the eighth transistor M8 is still turned on, and the output terminal HF_Output still outputs the second power supply voltage, that is, a low-level signal.

The second stage to the fourth stage are repeated for the next cycle.

It can be seen that, the turn-on degree of the fourth transistor M4 is controlled through the data voltage control signal to control the discharging speed for the first node Q (i.e., the degree, to which the fourth transistor M4 is turned on, is controlled through the data voltage control signal to control the speed for discharging the first node Q), the control electrode of the third transistor M3 is discharged by the fourth transistor M4 for a duration (that is, the time when the output terminal HF_Output of the AND gate 1 outputs a low-level signal) until VQ−VDD<Vth, and the clock signals with different duty ratios may be obtained by using the data voltage control signals with different magnitudes.

Figure 14:
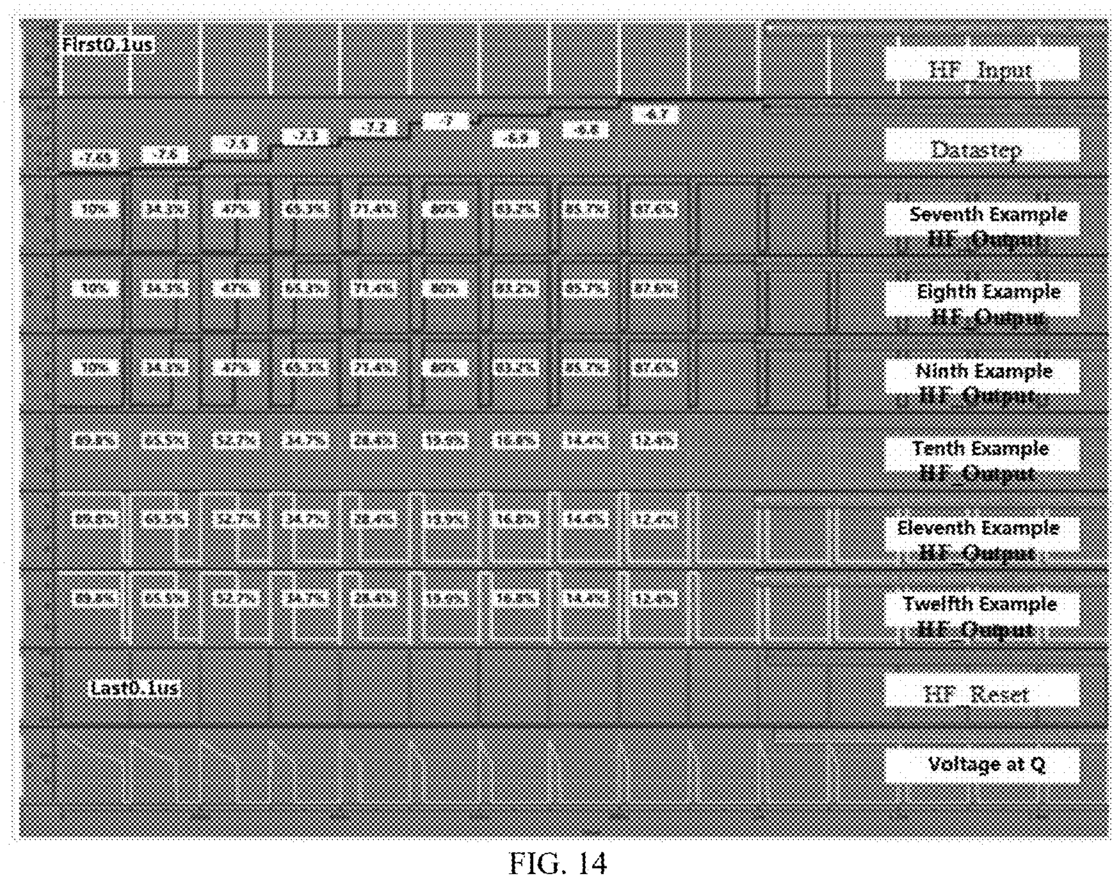
FIG. 14 is a schematic diagram showing simulation results of the flip-flop circuit in each of the seventh example to the twelfth example.

Each transistor of the flip-flop circuit in each of the seventh example to the twelfth example has a width-to-length ratio W/L=5/5. Referring to FIG. 14, it can be seen from the schematic diagram showing simulation results of the flip-flop circuit in each of the seventh example to the twelfth example that with the data voltage control signal Datastep=[−7.65V, −7.6V, −7.5V, −7.3V, −7.2V, −7V, −6.9V, −6.8V, −6.7V], a corresponding generated clock cycle has the following duty ratio (a high voltage/a cycle H): [10%, 34.3%, 47%, 65.3%, 71.4%, 80%, 83.2%, 85.7%, 87.6%] in each of the seventh example to the ninth example; [89.8%, 65.5%, 52.7%, 34.7%, 28.4%, 19.9%, 16.8%, 14.4%, 12.4%] in each of the tenth example to the twelfth example.

Figure 15:
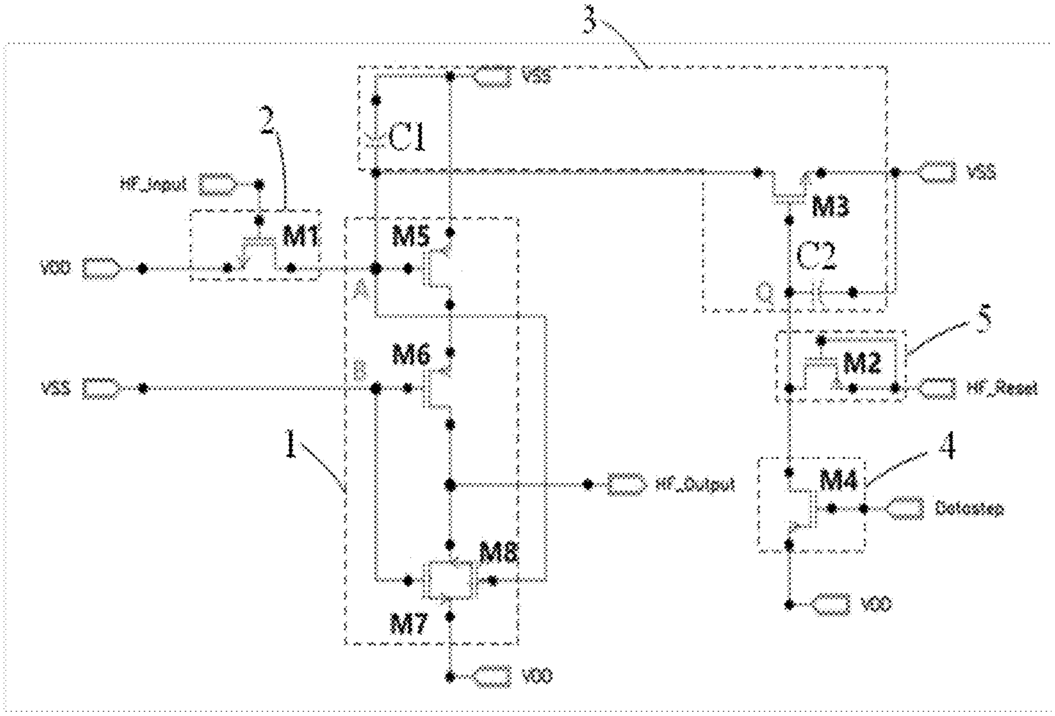
FIG. 15 is a schematic diagram of a flip-flop circuit in a thirteenth example of an embodiment of the present disclosure.

In a thirteenth example, FIG. 15 is a schematic diagram of a flip-flop circuit in a thirteenth example of an embodiment of the present disclosure. As shown in FIG. 15, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a first power supply voltage terminal VDD through the input sub-circuit 2, and a second input terminal B of the AND gate 1 is directly connected to the second power supply voltage terminal VSS. The reset sub-circuit 5 is connected to the first node Q.

Referring to FIG. 15, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this example, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 15, a first electrode of the first transistor M1 is connected to the first power supply voltage terminal VDD, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the second power supply voltage terminal VSS. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the thirteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the thirteenth example is described. With continued reference to FIG. 15, a step of generating each clock cycle signal of a clock signal by using the flip-flop circuit in the thirteenth example includes the following stages.

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the fifth transistor M5 is turned off, and the eighth transistor M8 is turned on. The output terminal HF_Output outputs the first power supply voltage, that is, a high-level signal. At the same time, the first node Q is charged through a data voltage control signal written by the data voltage control signal terminal, and a turn-on degree of the fourth transistor M4 (i.e., a degree to which the fourth transistor M4 is turned on) is controlled through a magnitude of the written data voltage control signal, thereby controlling a charging speed for the first node Q (i.e., a speed for charging the first node Q).

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the second power supply voltage, that is, a low-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q (i.e., the speed for charging the first node Q), the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitudes of the data voltage control signal.

Figure 16:
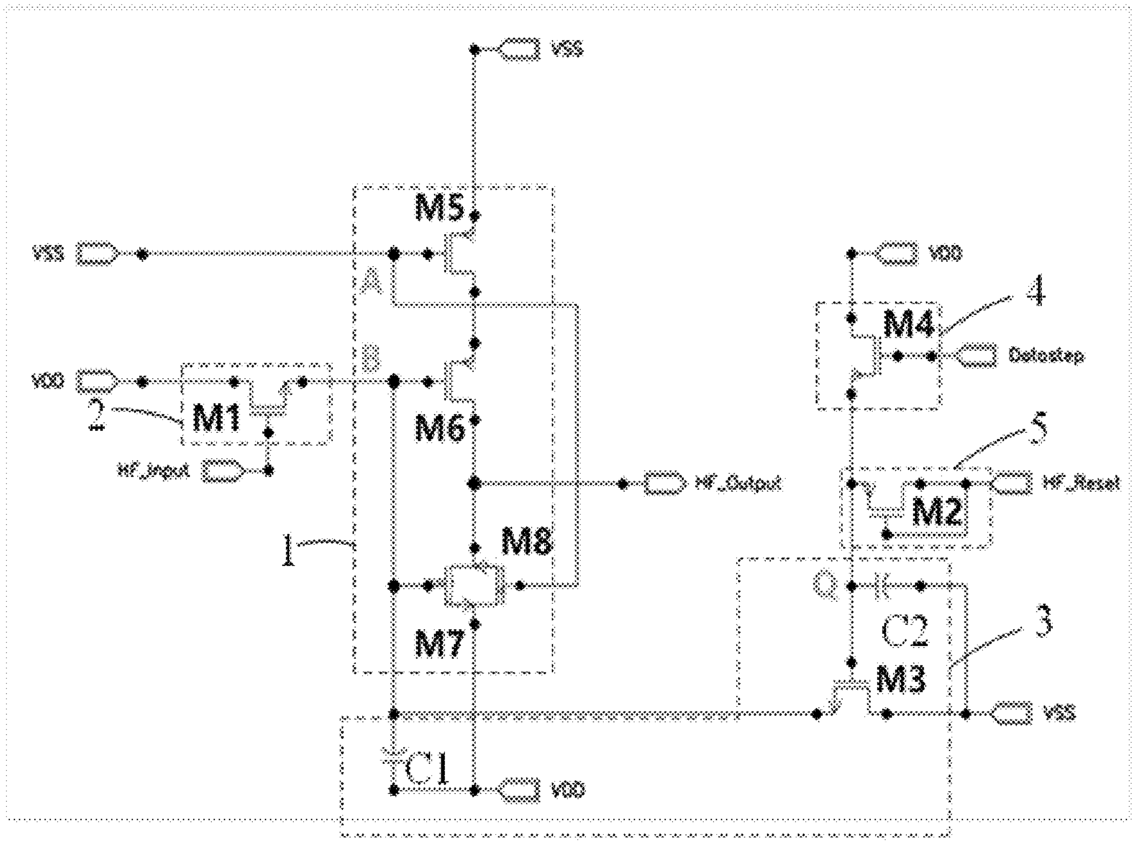
FIG. 16 is a schematic diagram of a flip-flop circuit in a fourteenth example of an embodiment of the present disclosure.

In a fourteenth example, FIG. 16 is a schematic diagram of a flip-flop circuit in a fourteenth example of an embodiment of the present disclosure. As shown in FIG. 16, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a first power supply voltage terminal VDD through the input sub-circuit 2, and a first input terminal A of the AND gate 1 is directly connected to the second power supply voltage terminal VSS. The reset sub-circuit 5 is connected to the first node Q.

Referring to FIG. 16, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this embodiment, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 16, a first electrode of the first transistor M1 is connected to the first power supply voltage terminal VDD, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the first power supply voltage terminal VDD. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the fourteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal −0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the fourteenth example is described. With continued reference to FIG. 16, a step of generating each clock cycle signal of a clock signal by using the flip-flop circuit in the fourteenth example includes the following stages.

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the sixth transistor M6 is turned off, and the seventh transistor M7 is turned on. The output terminal HF_Output outputs the first power supply voltage, that is, a high-level signal. At the same time, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the sixth transistor M6 is turned on, and the seventh transistor M7 is turned off. The output terminal HF_Output outputs the second power supply voltage, that is, a low-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the second input terminal B is kept at a low level by the first capacitor C1, the sixth transistor M6 is still turned on, the seventh transistor M7 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by using the data voltage control signals with different magnitudes, respectively.

Figure 17:
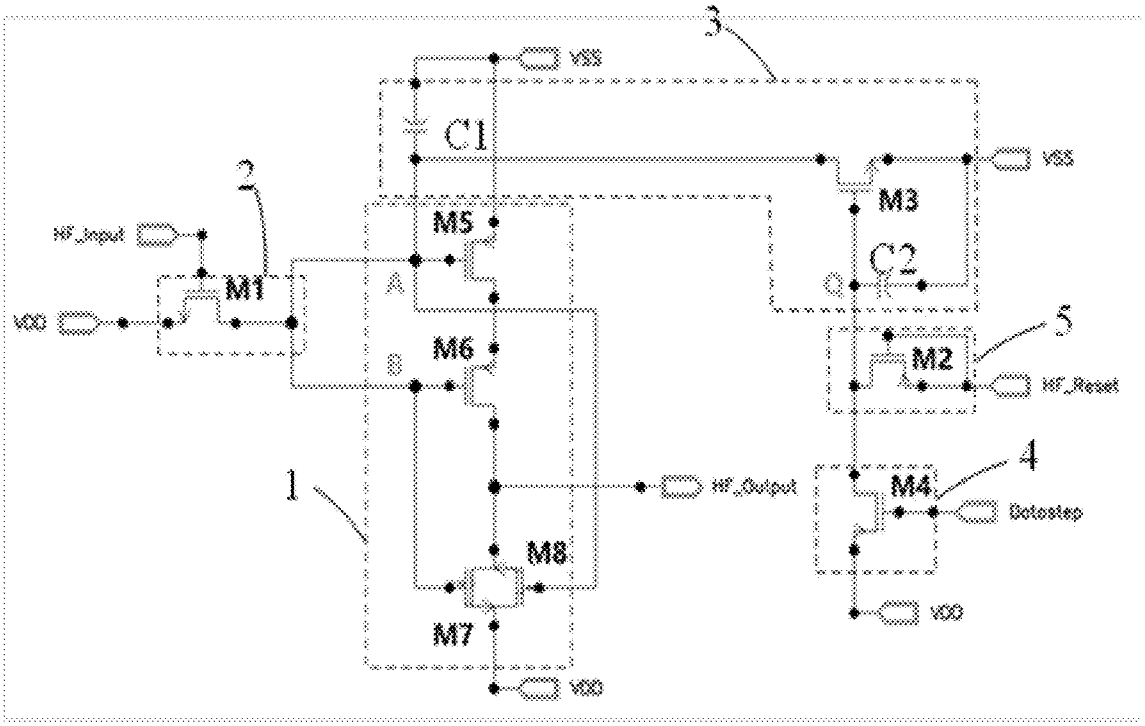
FIG. 17 is a schematic diagram of a flip-flop circuit in a fifteenth example of an embodiment of the present disclosure.

In a fifteenth example, FIG. 17 is a schematic diagram of a flip-flop circuit in a fifteenth example of an embodiment of the present disclosure. As shown in FIG. 17, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A and a second input terminal B of the AND gate 1 are connected to a first power supply voltage terminal VDD through the input sub-circuit 2. The reset sub-circuit 5 is connected to the first node Q.

Referring to FIG. 17, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this embodiment, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 17, a first electrode of the first transistor M1 is connected to the first power supply voltage terminal VDD, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the second power supply voltage terminal VSS. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A.

A method for generating a clock signal by the flip-flop circuit in the fifteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the fifteenth example is described. With continued reference to FIG. 17, a step of generating each clock cycle signal of a clock signal by using the flip-flop circuit in the fifteenth example includes the following stages.

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the fifth transistor M5 and the sixth transistor M6 are turned off, and the seventh transistor M7 and the eighth transistor M8 are turned on. The output terminal HF_Output outputs the first power supply voltage, that is, a high-level signal. At the same time, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the second power supply voltage, that is, a low-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by using the data voltage control signals with different magnitudes, respectively.

Figure 18:
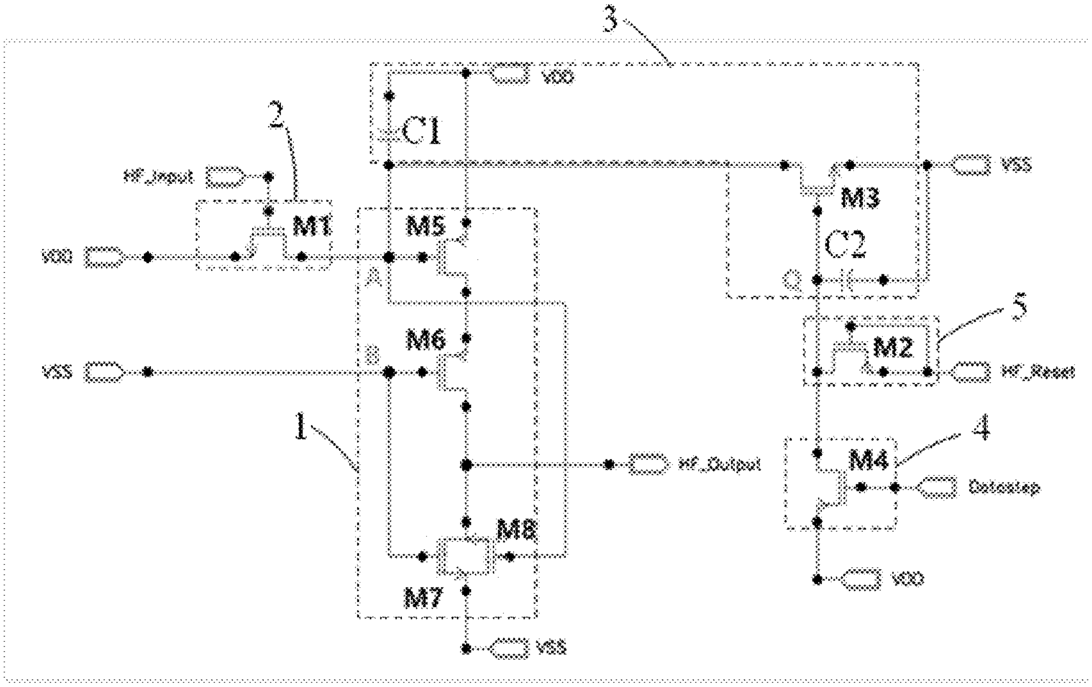
FIG. 18 is a schematic diagram of a flip-flop circuit in a sixteenth example of an embodiment of the present disclosure.

In a sixteenth example, FIG. 18 is a schematic diagram of a flip-flop circuit in a sixteenth example of an embodiment of the present disclosure. As shown in FIG. 18, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a first power supply voltage terminal VDD through the input sub-circuit 2, and a second input terminal B of the AND gate 1 is directly connected to the second power supply voltage terminal VSS. The reset sub-circuit 5 is connected to the first node Q.

Referring to FIG. 18, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this embodiment, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 18, a first electrode of the first transistor M1 is connected to the first power supply voltage terminal VDD, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the sixteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the sixteenth example is described. With continued reference to FIG. 18, a step of generating each clock cycle signal of a clock signal by using the flip-flop circuit in the sixteenth example includes:

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the fifth transistor M5 is turned off, and the eighth transistor M8 is turned on. The output terminal HF_Output outputs the second power supply voltage, that is, a low-level signal. At the same time, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the first power supply voltage, that is, a high-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 19:
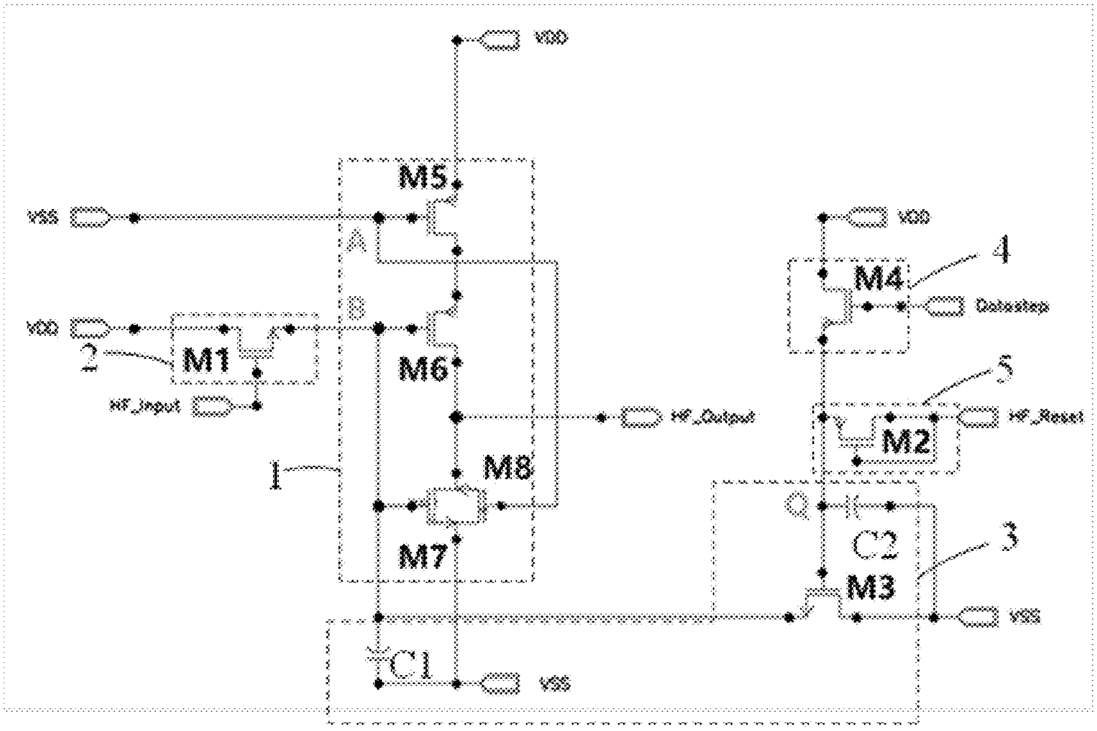
FIG. 19 is a schematic diagram of a flip-flop circuit in a seventeenth example of an embodiment of the present disclosure.

In a seventeenth example, FIG. 19 is a schematic diagram of a flip-flop circuit in a seventeenth example of an embodiment of the present disclosure. As shown in FIG. 19, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a first power supply voltage terminal VDD through the input sub-circuit 2, and a first input terminal A of the AND gate 1 is directly connected to the second power supply voltage terminal VSS. The reset sub-circuit 5 is connected to the first node Q.

Referring to FIG. 19, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this embodiment, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 19, a first electrode of the first transistor M1 is connected to the first power supply voltage terminal VDD, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the second power supply voltage terminal VSS. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the seventeenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the seventeenth example is described. With continued reference to FIG. 19, a step of generating each clock cycle signal of a clock signal by using the flip-flop circuit in the seventeenth example includes:

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the sixth transistor M6 is turned off, and the seventh transistor M7 is turned on. The output terminal HF_Output outputs the second power supply voltage, that is, a low-level signal. At the same time, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the second input terminal B, and therefore, the sixth transistor M6 is turned on, and the seventh transistor M7 is turned off. The output terminal HF_Output outputs the first power supply voltage, that is, a high-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the second input terminal B is kept at a low level by the first capacitor C1, the sixth transistor M6 is still turned on, the seventh transistor M7 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 20:
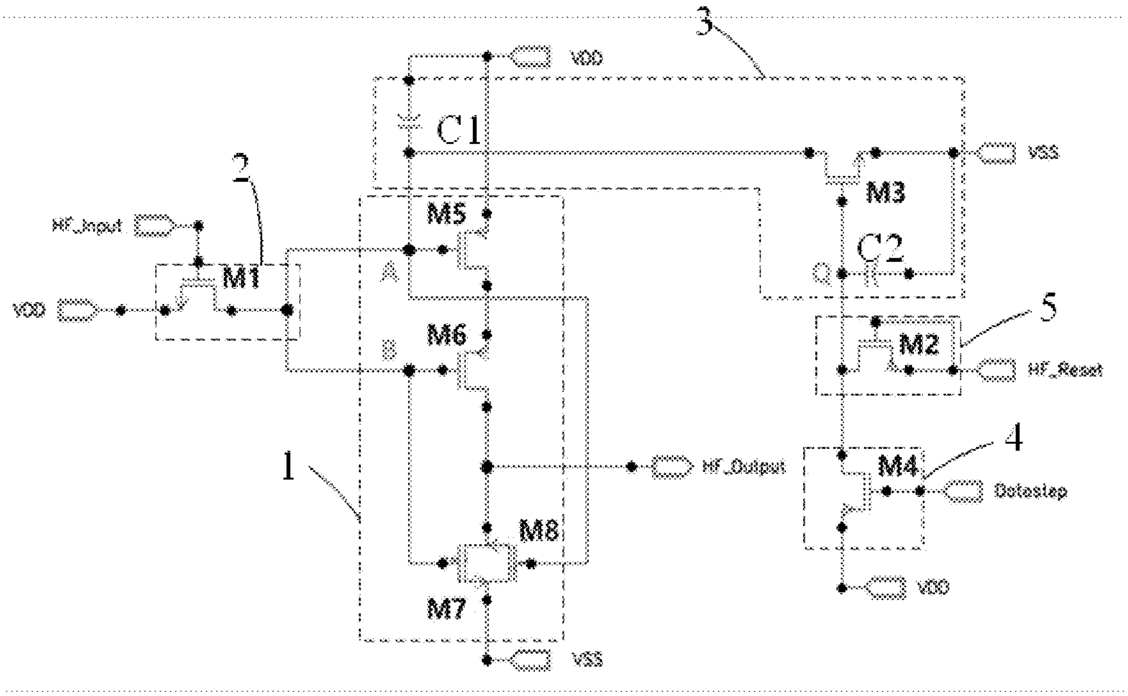
FIG. 20 is a schematic diagram of a flip-flop circuit in an eighteenth example of an embodiment of the present disclosure.

In an eighteenth example, FIG. 20 is a schematic diagram of a flip-flop circuit in an eighteenth example of an embodiment of the present disclosure. As shown in FIG. 20, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A and a second input terminal B of the AND gate 1 are connected to a first power supply voltage terminal VDD through the input sub-circuit 2. The reset sub-circuit 5 is connected to the first node Q.

Referring to FIG. 20, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4. The AND gate 1 may include a fifth transistor M5, a sixth transistor M6, a seventh transistor M7, and an eighth transistor M8. The first transistor M1, the third transistor M3, the seventh transistor M7, and the eighth transistor M8 have the same switching characteristics, and switching characteristics of the second transistor M2 are opposite to the switching characteristics of the first transistor M1, but are the same as those of the fourth transistor M4, the fifth transistor M5, and the sixth transistor M6. In this embodiment, as an example, the first transistor M1, the third transistor M3, the seventh transistor M7, and the eighth transistor M8 are N-type transistors, and the second transistor M2, the fourth transistor M4, the fifth transistor M5, and the sixth transistor M6 are P-type transistors.

Specifically, with reference to FIG. 20, a first electrode of the first transistor M1 is connected to the first power supply voltage terminal VDD, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the first power supply voltage terminal VDD, a second electrode of the fourth transistor M4 is connected to the first node Q, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A.

A method for generating a clock signal by the flip-flop circuit in the eighteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal −0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the eighteenth example is described. With continued reference to FIG. 20, a step of generating each clock cycle signal of a clock signal by using the flip-flop circuit in the eighteenth example includes:

In a first stage, i.e., an initial stage of the clock cycle, the reset signal written into the reset signal terminal HF_Reset is a low-level signal, so that the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off. A high-level signal is input by the input signal control terminal HF_Input, so that the fifth transistor M5 and the sixth transistor M6 are turned off, and the seventh transistor M7 and the eighth transistor M8 are turned on. The output terminal HF_Output outputs the second power supply voltage, that is, a low-level signal. At the same time, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the first power supply voltage, that is, a high-level signal.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 21:
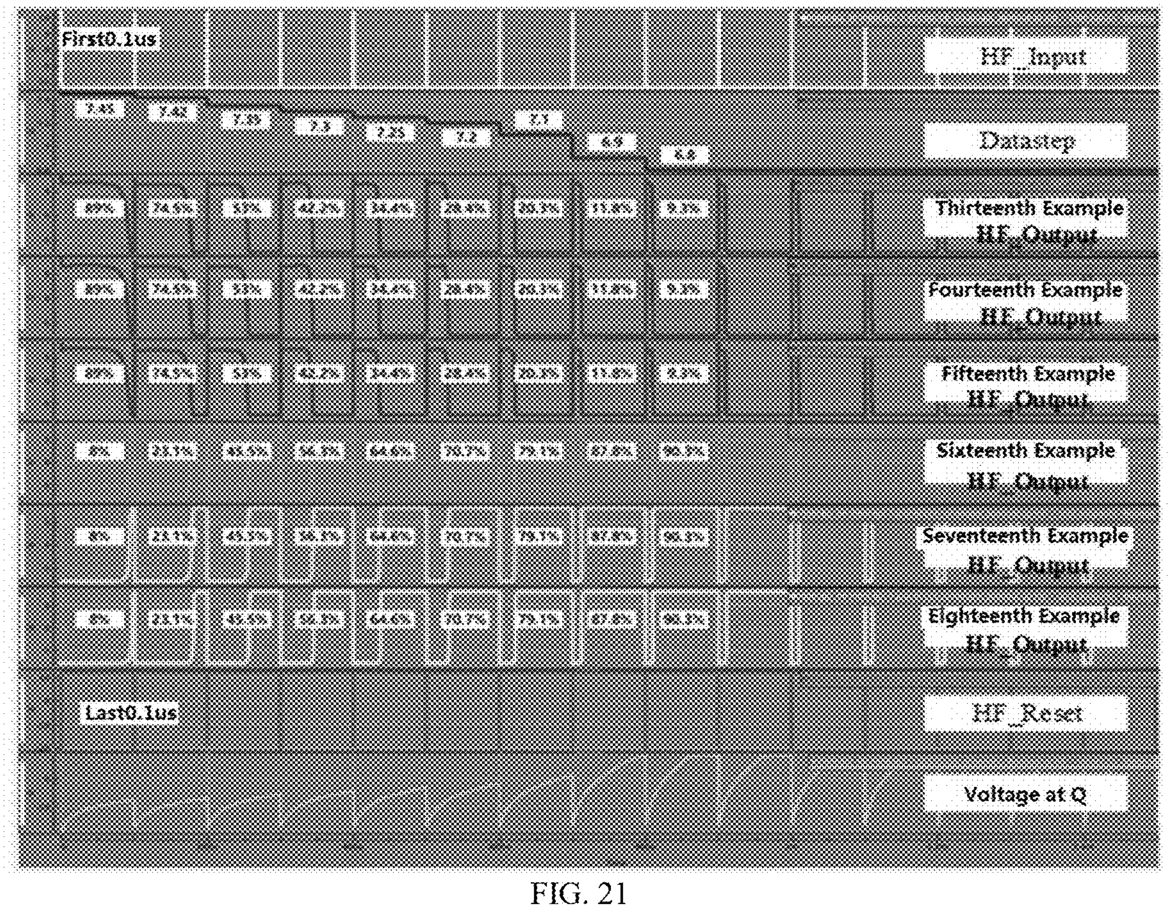
FIG. 21 is a schematic diagram showing simulation results of the flip-flop circuit in each of the thirteenth example to the eighteenth example.

Each transistor of the flip-flop circuit in each of the thirteenth example to the eighteenth example has a width-to-length ratio W/L=5/5. Referring to FIG. 21, it can be seen from the schematic diagram showing simulation results of the flip-flop circuit in each of the thirteenth example to the eighteenth example that with the data voltage control signal Datastep=[7.45V, 7.42V, 7.35V, 7.3V, 7.25V, 7.2V, 7.1V, 6.9V, 6.8V], a corresponding generated clock cycle has the following duty ratio (a high voltage/a cycle H): [89%, 74.5%, 53%, 42.2%, 34.4%, 28.4%, 20.3%, 11.8%, 9.3%] in each of the thirteenth example to the fifteenth example; [8%, 23.1%, 45.5%, 56.3%, 64.6%, 70.7%, 79.1%, 87.8%, 90.3%] in each of the sixteenth example to the eighteenth example.

Figure 22:
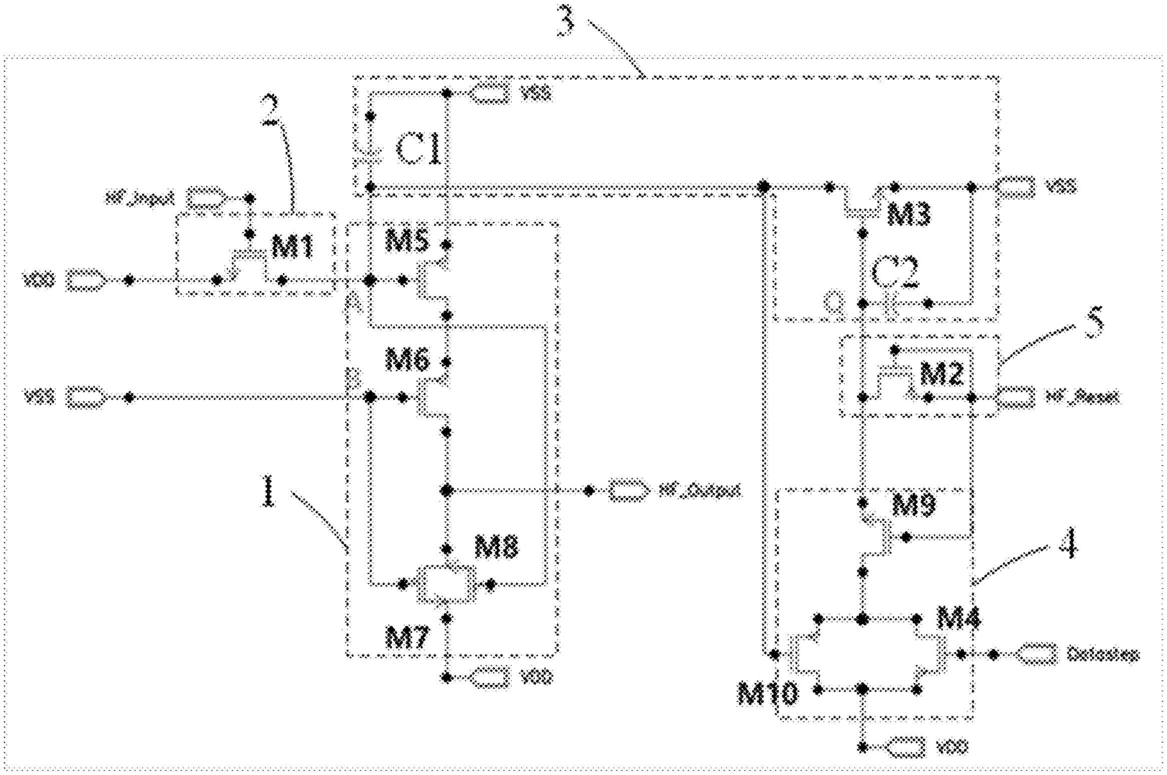
FIG. 22 is a schematic diagram of a flip-flop circuit in a nineteenth example of an embodiment of the present disclosure.

In a nineteenth example, FIG. 22 is a schematic diagram of a flip-flop circuit in a nineteenth example of an embodiment of the present disclosure. As shown in FIG. 22, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a first power supply voltage terminal VDD through the input sub-circuit 2, and a second input terminal B of the AND gate 1 is directly connected to the second power supply voltage terminal VSS. The reset sub-circuit 5 is connected to the first node Q.

Referring to FIG. 22, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 22, a first electrode of the first transistor M1 is connected to the first power supply voltage terminal VDD, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the second power supply voltage terminal VSS. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the nineteenth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the nineteenth example is described. With continued reference to FIG. 22, a step of generating each clock cycle signal of a clock signal by using the flip-flop circuit in the nineteenth example includes:

In a first stage, i.e., an initial stage of the clock cycle, the reset signal written into the reset signal terminal HF_Reset is a low-level signal, so that the second transistor M2 is turned on, the ninth transistor M9 is turned off, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the fifth transistor M5 is turned off, and the eighth transistor M8 is turned on. The output terminal HF_Output outputs the first power supply voltage, that is, a high-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the second power supply voltage, that is, a low-level signal. At the same time, the tenth transistor M10 is turned on, and the first node Q is quickly charged to the first power supply voltage, which can improve Tf of the output signal at the output terminal HF_Output.

In a fourth stage, that is, before the cycle ends, the reset signal written by the reset signal terminal HF_Reset is a low-level signal, so that the second transistor M2 is turned on, the ninth transistor M9 is turned off, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 23:
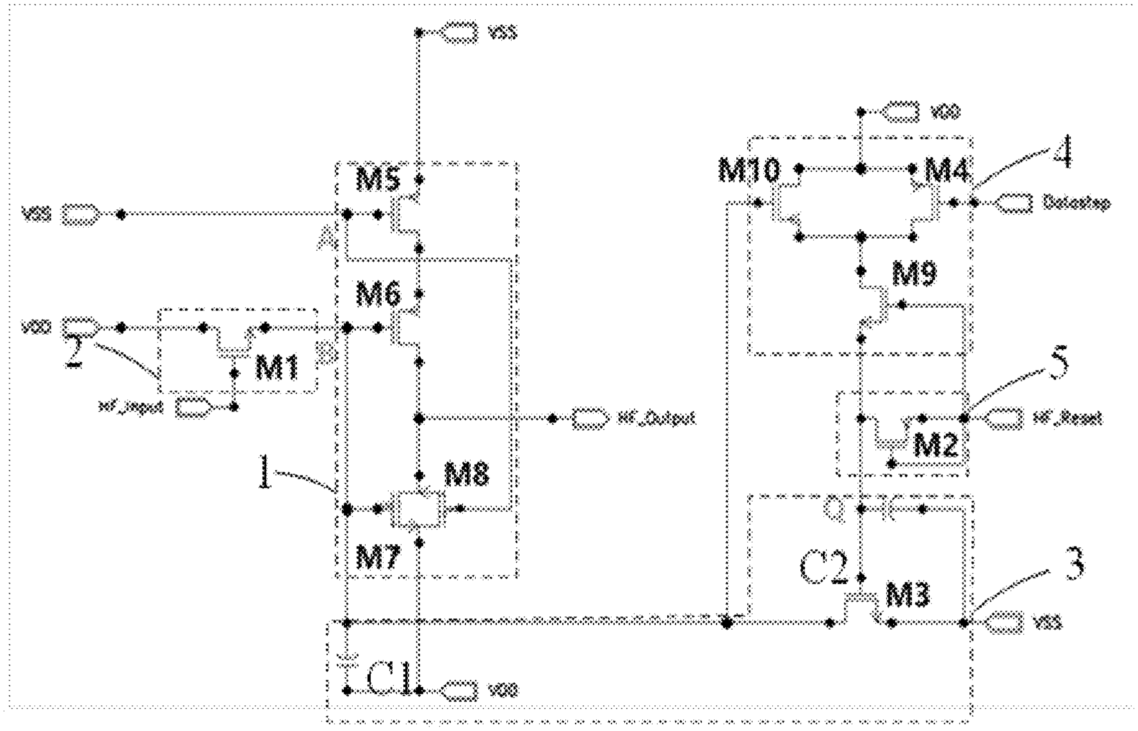
FIG. 23 is a schematic diagram of a flip-flop circuit in a twentieth example of an embodiment of the present disclosure.

In a twentieth example, FIG. 23 is a schematic diagram of a flip-flop circuit in a twentieth example of an embodiment of the present disclosure. As shown in FIG. 23, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a first power supply voltage terminal VDD through the input sub-circuit 2, and a first input terminal A of the AND gate 1 is directly connected to the second power supply voltage terminal VSS. The reset sub-circuit 5 is connected to the first node Q.

Referring to FIG. 23, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 23, a first electrode of the first transistor M1 is connected to the first power supply voltage terminal VDD, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the first power supply voltage terminal VDD. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the second input terminal B.

A method for generating a clock signal by the flip-flop circuit in the twentieth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the twentieth example is described. With continued reference to FIG. 23, a step of generating each clock cycle signal of a clock signal by using the flip-flop circuit in the twentieth example includes:

In a first stage, i.e., an initial stage of the clock cycle, the reset signal written into the reset signal terminal HF_Reset is a low-level signal, so that the ninth transistor M9 is turned off and the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the sixth transistor M6 is turned off, and the seventh transistor M7 is turned on. The output terminal HF_Output outputs the first power supply voltage, that is, a high-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the sixth transistor M6 is turned on, and the seventh transistor M7 is turned off. The output terminal HF_Output outputs the second power supply voltage, that is, a low-level signal. At the same time, the tenth transistor M10 is turned on, and the first node Q is quickly charged to the first power supply voltage, which can improve Tf of the output signal at the output terminal HF_Output.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the second input terminal B is kept at a low level by the first capacitor C1, the sixth transistor M6 is still turned on, the seventh transistor M7 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 24:
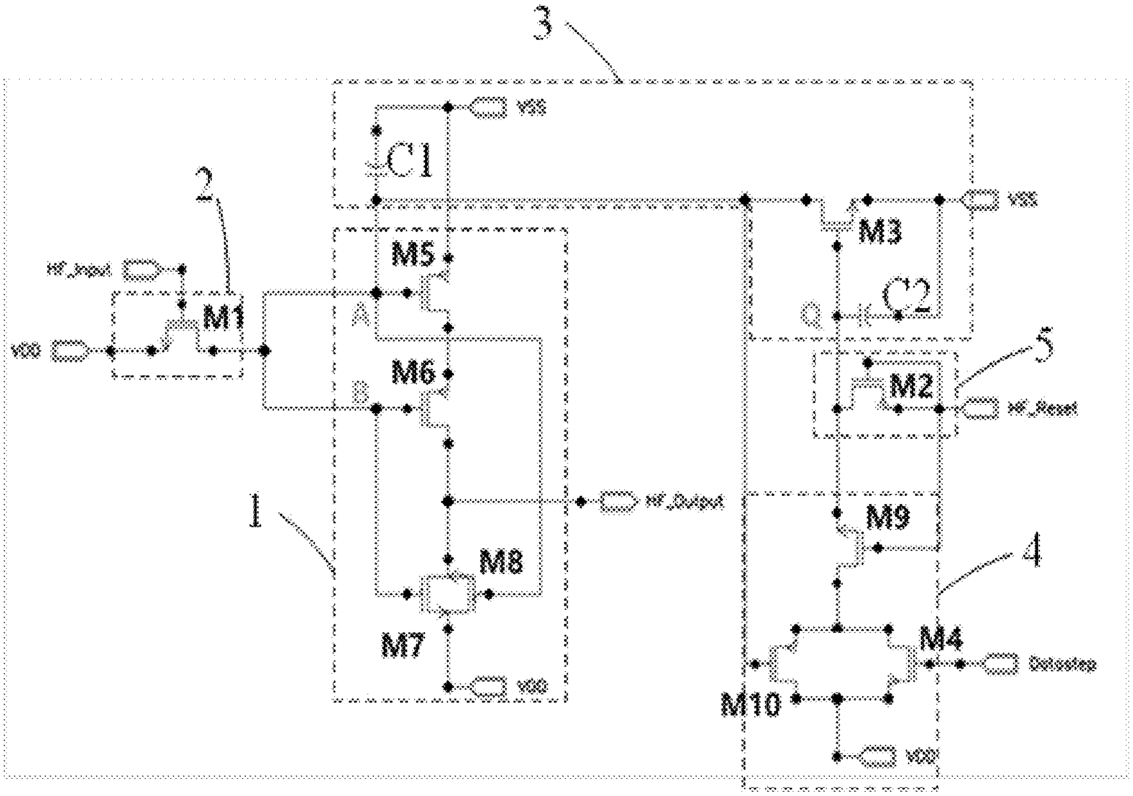
FIG. 24 is a schematic diagram of a flip-flop circuit in a twenty-first example of an embodiment of the present disclosure.

In a twenty-first example, FIG. 24 is a schematic diagram of a flip-flop circuit in a twenty-first example of an embodiment of the present disclosure. As shown in FIG. 24, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A and a second input terminal B of the AND gate 1 are connected to a first power supply voltage terminal VDD through the input sub-circuit 2. The reset sub-circuit 5 is connected to the first node Q.

Referring to FIG. 24, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 24, a first electrode of the first transistor M1 is connected to the first power supply voltage terminal VDD, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the second power supply voltage terminal VSS. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the second power supply voltage terminal VSS, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the first power supply voltage terminal VDD, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the twenty-first example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the twenty-first example is described. With continued reference to FIG. 24, a step of generating each clock cycle signal of a clock signal by using the flip-flop circuit in the twenty-first example includes:

In a first stage, i.e., an initial stage of the clock cycle, the reset signal written into the reset signal terminal HF_Reset is a low-level signal, so that the second transistor M2 is turned on, the ninth transistor M9 is turned off, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the fifth transistor M5 and the sixth transistor M6 are turned off, and the seventh transistor M7 and the eighth transistor M8 are turned on. The output terminal HF_Output outputs the first power supply voltage, that is, a high-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the second power supply voltage, that is, a low-level signal. At the same time, the tenth transistor M10 is turned on, and the first node Q is quickly charged to the first power supply voltage, which can improve a fall time Tf of the output signal at the output terminal HF_Output.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the second power supply voltage, that is, a low-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 25:
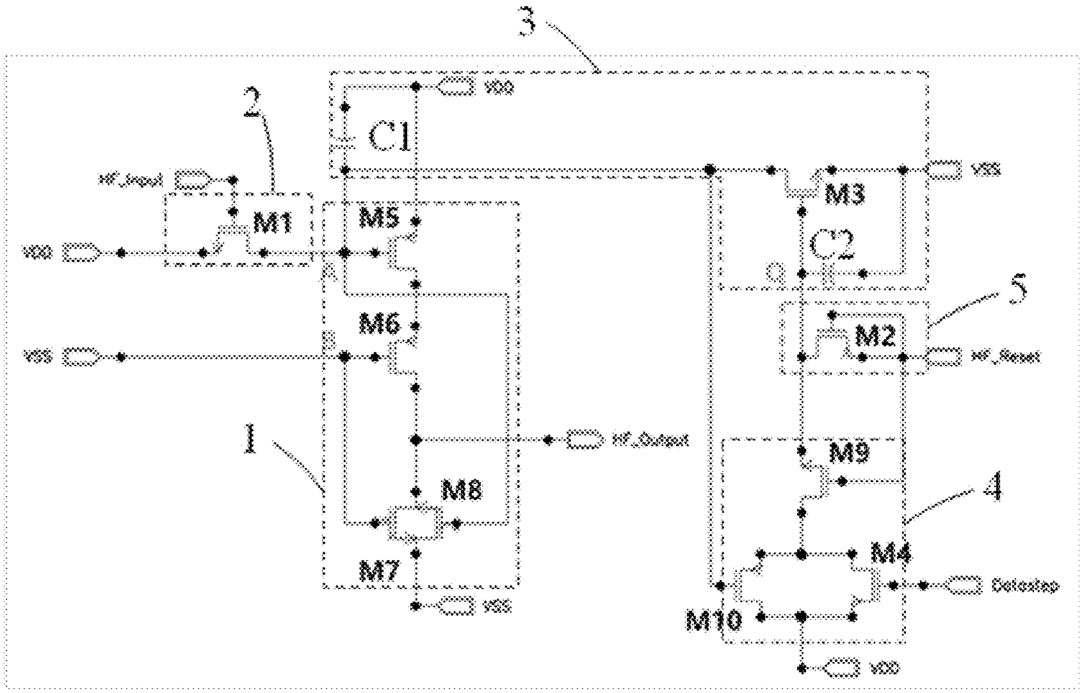
FIG. 25 is a schematic diagram of a flip-flop circuit in a twenty-second example of an embodiment of the present disclosure.

In a twenty-second example, FIG. 25 is a schematic diagram of a flip-flop circuit in a twenty-second example of an embodiment of the present disclosure. As shown in FIG. 25, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A of the AND gate 1 is connected to a first power supply voltage terminal VDD through the input sub-circuit 2, and a second input terminal B of the AND gate 1 is directly connected to the second power supply voltage terminal VSS. The reset sub-circuit 5 is connected to the first node Q.

Referring to FIG. 25, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 25, a first electrode of the first transistor M1 is connected to the first power supply voltage terminal VDD, a second electrode of the first transistor M1 is connected to the first input terminal A, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the twenty-second example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the twenty-second example is described. With continued reference to FIG. 25, a step of generating each clock cycle signal of a clock signal by using the flip-flop circuit in the twenty-second example includes:

In a first stage, i.e., an initial stage of the clock cycle, the reset signal written into the reset signal terminal HF_Reset is a low-level signal, so that the second transistor M2 is turned on, the ninth transistor M9 is turned off, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the fifth transistor M5 is turned off, and the eighth transistor M8 is turned on. The output terminal HF_Output outputs the second power supply voltage, that is, a low-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the first power supply voltage, that is, a high-level signal. At the same time, the tenth transistor M10 is turned on, and the first node Q is quickly charged to the first power supply voltage, which can improve Tr of the output signal at the output terminal HF_Output.

In a fourth stage, that is, before the cycle ends, the reset signal written by the reset signal terminal HF_Reset is a low-level signal, so that the second transistor M2 is turned on, the ninth transistor M9 is turned off, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 26:
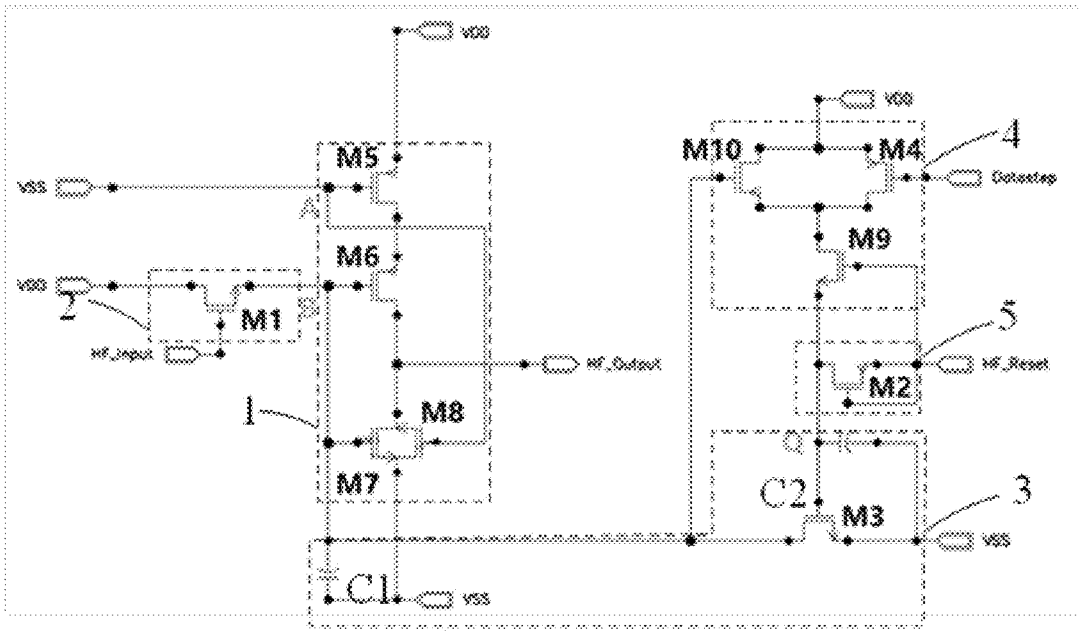
FIG. 26 is a schematic diagram of a flip-flop circuit in a twenty-third example of an embodiment of the present disclosure.

In a twenty-third example, FIG. 26 is a schematic diagram of a flip-flop circuit in a twenty-third example of an embodiment of the present disclosure. As shown in FIG. 26, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a second input terminal B of the AND gate 1 is connected to a first power supply voltage terminal VDD through the input sub-circuit 2, and a first input terminal A of the AND gate 1 is directly connected to the second power supply voltage terminal VSS. The reset sub-circuit 5 is connected to the first node Q.

Referring to FIG. 26, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 26, a first electrode of the first transistor M1 is connected to the first power supply voltage terminal VDD, a second electrode of the first transistor M1 is connected to the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a second terminal of the first capacitor C1 and the second input terminal B, and a control electrode of the third transistor M3 is connected to a first terminal of the second capacitor C2 and the first node Q. A first terminal of the first capacitor C1 is connected to a second electrode of the seventh transistor M7 and the second power supply voltage terminal VSS. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the second input terminal B. A method for generating a clock signal by the flip-flop circuit in the twenty-third example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the twenty-third example is described. With continued reference to FIG. 26, a step of generating each clock cycle signal of a clock signal by using the flip-flop circuit in the twenty-third example includes:

In a first stage, i.e., an initial stage of the clock cycle, the reset signal written into the reset signal terminal HF_Reset is a low-level signal, so that the ninth transistor M9 is turned off, the second transistor M2 is turned on, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the sixth transistor M6 is turned off, and the seventh transistor M7 is turned on. The output terminal HF_Output outputs the second power supply voltage, that is, a low-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the sixth transistor M6 is turned on, and the seventh transistor M7 is turned off. The output terminal HF_Output outputs the first power supply voltage, that is, a high-level signal. At the same time, the tenth transistor M10 is turned on, and the first node Q is quickly charged to the first power supply voltage, which can improve Tr of the output signal at the output terminal HF_Output.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the second input terminal B is kept at a low level by the first capacitor C1, the sixth transistor M6 is still turned on, the seventh transistor M7 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 27:
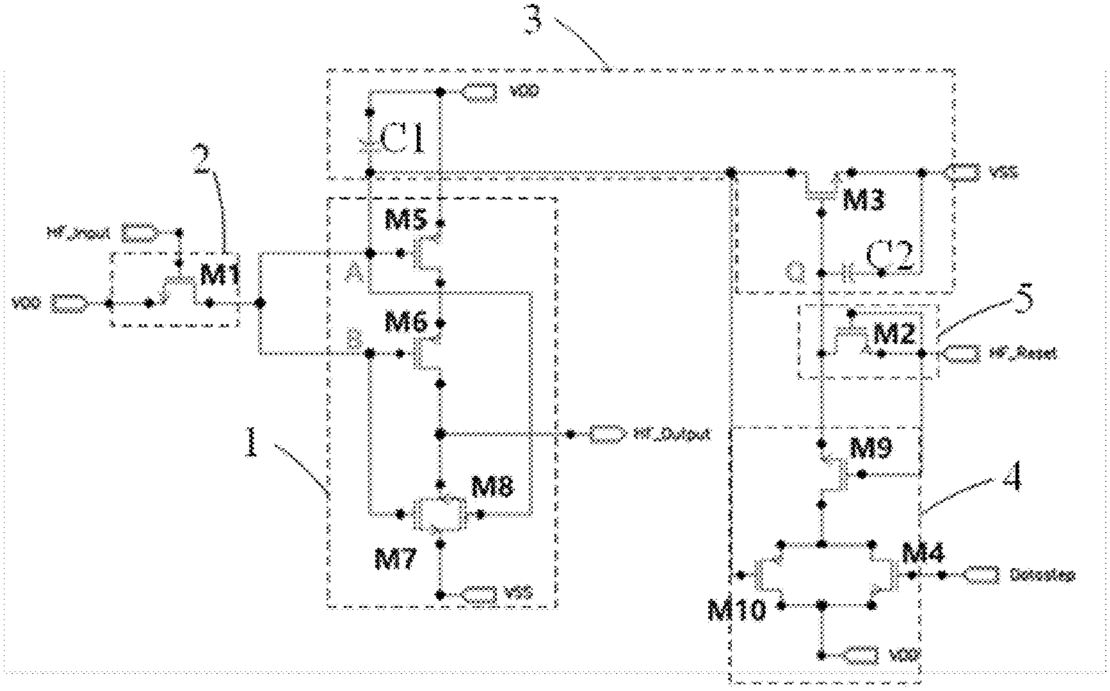
FIG. 27 is a schematic diagram of a flip-flop circuit in a twenty-fourth example of an embodiment of the present disclosure.

In a twenty-fourth example, FIG. 27 is a schematic diagram of a flip-flop circuit in a twenty-fourth example of an embodiment of the present disclosure. As shown in FIG. 27, the flip-flop circuit includes an input sub-circuit 2, an AND gate 1, a control sub-circuit 4, a duty ratio adjustment sub-circuit 3, and a reset sub-circuit 5. The control sub-circuit 4 is connected to the duty ratio adjustment sub-circuit 3, a connection node between the control sub-circuit and the duty ratio adjustment sub-circuit is a first node Q, a first input terminal A and a second input terminal B of the AND gate 1 are connected to a first power supply voltage terminal VDD through the input sub-circuit 2. The reset sub-circuit 5 is connected to the first node Q.

Referring to FIG. 27, the first input sub-circuit 2 may include a first transistor M1. The reset sub-circuit 5 may include a second transistor M2. The duty ratio adjustment sub-circuit 3 may include a third transistor M3, a first capacitor C1, and a second capacitor C2. The control sub-circuit 4 may include a fourth transistor M4, a ninth transistor M9, and a tenth transistor M10. The AND gate 1 may include a fifth transistor M5, a sixth transistor M6, a seventh transistor M7, and an eighth transistor M8. The first transistor M1, the third transistor M3, the seventh transistor M7, the eighth transistor M8 and the ninth transistor M9 have the same switching characteristics, and switching characteristics of the second transistor M2 are opposite to the switching characteristics of the first transistor M1, but are the same as those of the fourth transistor M4, the fifth transistor M5, the sixth transistor M6 and the tenth transistor M10. In this embodiment, as an example, the first transistor M1, the third transistor M3, the seventh transistor M7, the eighth transistor M8 and the ninth transistor M9 are N-type transistors, and the second transistor M2, the fourth transistor M4, the fifth transistor M5, the sixth transistor M6 and the tenth transistor M10 are P-type transistors.

Specifically, with reference to FIG. 27, a first electrode of the first transistor M1 is connected to the first power supply voltage terminal VDD, a second electrode of the first transistor M1 is connected to the first input terminal A and the second input terminal B, and a control electrode of the first transistor M1 is connected to an input signal control terminal HF_Input. A first electrode of the second transistor M2 is connected to its control electrode and a reset signal terminal HF_Reset, and a second electrode of the second transistor M2 is connected to the first node Q. A first electrode of the third transistor M3 is connected to the second power supply voltage terminal VSS and a second terminal of the second capacitor C2, a second electrode of the third transistor M3 is connected to a first terminal of the first capacitor C1 and the first input terminal A, and a control electrode of the third transistor M3 is connected to a first terminal of the second capacitor C2 and the first node Q. A second terminal of the first capacitor C1 is connected to a first electrode of the fifth transistor M5 and the first power supply voltage terminal VDD. A first electrode of the fourth transistor M4 is connected to the first power supply voltage terminal VDD and a second electrode of the tenth transistor M10, a second electrode of the fourth transistor M4 is connected to a first electrode of the tenth transistor M10 and a first electrode of the ninth transistor M9, and a control electrode of the fourth transistor M4 is connected to a data voltage control signal terminal. The first electrode of the fifth transistor M5 is connected to the first power supply voltage terminal VDD, a second electrode of the fifth transistor M5 is connected to a first electrode of the sixth transistor M6, and a control electrode of the fifth transistor M5 is connected to the first input terminal A. A second electrode of the sixth transistor M6 is connected to an output terminal HF_Output, and a control electrode of the sixth transistor M6 is connected to the second input terminal B. A first electrode of the seventh transistor M7 is connected to a second electrode of the eighth transistor M8, a second electrode of the seventh transistor M7 is connected to a first electrode of the eighth transistor M8 and the second power supply voltage terminal VSS, and a control electrode of the seventh transistor M7 is connected to the second input terminal B. A control electrode of the eighth transistor M8 is connected to the first input terminal A. A second electrode of the ninth transistor M9 is connected to the first node Q, and a control electrode of the ninth transistor M9 is connected to the reset signal terminal HF_Reset. A control electrode of the tenth transistor M10 is connected to the first input terminal A.

A method for generating a clock signal by the flip-flop circuit in the twenty-fourth example is described only as an example where a first power supply voltage is 8V, a second power supply voltage is −8V; in a timing of an input control signal, a high-level signal is 12V, a low-level signal is −12V, a cycle is H=100 μs, and a duty ratio is a high-level signal/a low-level signal=0.1 μs/99.9 μs; in a timing of a reset signal, a high-level signal is 12V, a low-level signal is −20V, a cycle is H=100 μs, and a duty ratio is a high-level signal/a low-level signal=99.9 μs/0.1 μs; a capacitance of the first capacitor C1 is 20 fF and a capacitance of the second capacitor C2 is 2 pF.

Next, an operation of the flip-flop circuit in the twenty-fourth example is described. With continued reference to FIG. 27, a step of generating each clock cycle signal of a clock signal by using the flip-flop circuit in the twenty-fourth example includes:

In a first stage, i.e., an initial stage of the clock cycle, the reset signal written into the reset signal terminal HF_Reset is a low-level signal, so that the second transistor M2 is turned on, the ninth transistor M9 is turned off, a potential at the first node Q is reset to 20V, and the third transistor M3 is turned off in this stage.

In a second stage, i.e., at the beginning of the clock cycle, the reset signal at the reset signal terminal HF_Reset is a high-level signal, so that the second transistor M2 is turned off and the ninth transistor M9 is turned on. A high-level signal is input by the input signal control terminal HF_Input, so that the fifth transistor M5 and the sixth transistor M6 are turned off, and the seventh transistor M7 and the eighth transistor M8 are turned on. The output terminal HF_Output outputs the second power supply voltage, that is, a low-level signal. At the same time, the ninth transistor M9 is turned on, the first node Q is charged through a data voltage control signal written by the data voltage control signal terminal, and a turn-on degree of the fourth transistor M4 is controlled through a magnitude of the written data voltage control signal, thereby controlling a charging speed for the first node Q.

In a third stage, after a duration t elapses, the first node Q is charged until the potential at the first node Q minus the second power supply voltage is greater than a threshold voltage of the third transistor M3, that is, VQ−VSS>Vth, so that the third transistor M3 is turned on, a second power supply voltage written by the second power supply voltage terminal VSS is written to the first input terminal A, and therefore, the fifth transistor M5 is turned on, and the eighth transistor M8 is turned off. The output terminal HF_Output outputs the first power supply voltage, that is, a high-level signal. At the same time, the tenth transistor M10 is turned on, and the first node Q is quickly charged to the first power supply voltage, which can improve Tr of the output signal at the output terminal HF_Output.

In a fourth stage, that is, before the cycle ends, the reset signal written by the reset signal terminal HF_Reset is a low-level signal, so that the second transistor M2 is turned on, the potential at the first node Q is reset to −20V, the third transistor M3 is turned off, the first input terminal A is kept at a low level by the first capacitor C1, the fifth transistor M5 is still turned on, the eighth transistor M8 is still turned off, and the output terminal HF_Output still outputs the first power supply voltage, that is, a high-level signal.

The second stage to the fourth stage are repeated for the next cycle.

It can be seen that the turn-on degree of the fourth transistor M4 is controlled through the data voltage control signal to control the charging speed for the first node Q, the control electrode of the third transistor M3 is charged by the fourth transistor M4 for a duration (that is, the time when the output terminal HF_Output of the AND gate 1 outputs a high-level signal) until VQ−VSS>Vth, and the clock signals with different duty ratios may be obtained by adjusting the magnitude of the data voltage control signal.

Figure 28:
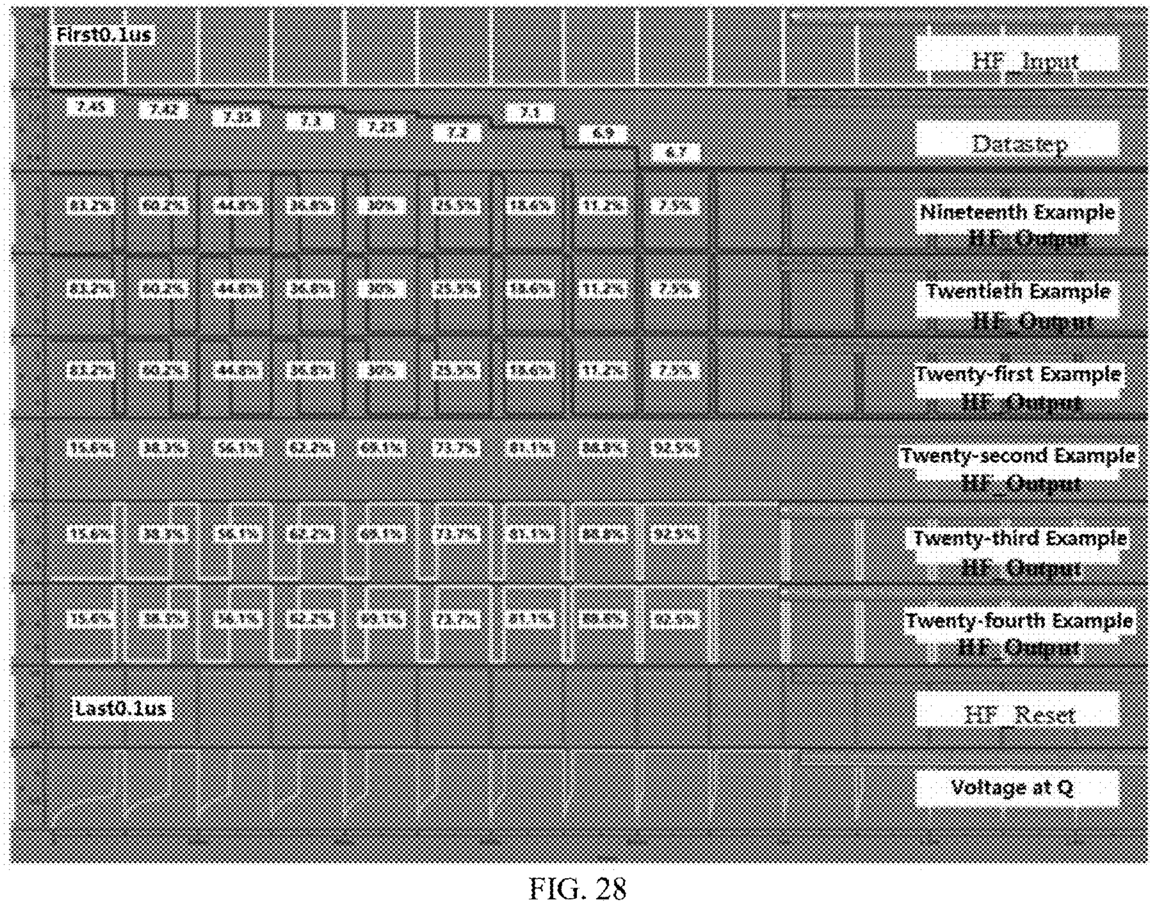
FIG. 28 is a schematic diagram showing simulation results of the flip-flop circuit in each of the nineteenth example to the twenty-fourth example.

Each transistor of the flip-flop circuit in each of the nineteenth example to the twenty-fourth example has a width-to-length ratio W/L=5/5. Referring to FIG. 28, it can be seen from the schematic diagram showing simulation results of the flip-flop circuit in each of the nineteenth example to the twenty-fourth example that with the data voltage control signal Datastep=[7.45V, 7.42V, 7.35V, 7.3V, 7.25V, 7.2V, 7.1V, 6.9V, 6.7V], a corresponding generated clock cycle has the following duty ratio (a high voltage/a cycle H): [83.2%, 60.2%, 44.8%, 36.8%, 30%, 25.5%, 18.6%, 11.2%, 7.5%] in each of the nineteenth example to the twenty-first example; [15.6%, 38.3%, 56.1%, 62.2%, 69.1%, 73.7%, 81.1%, 88.8%, 92.5%] in each of the twenty-second example to the twenty-fourth example.

Figure 29:
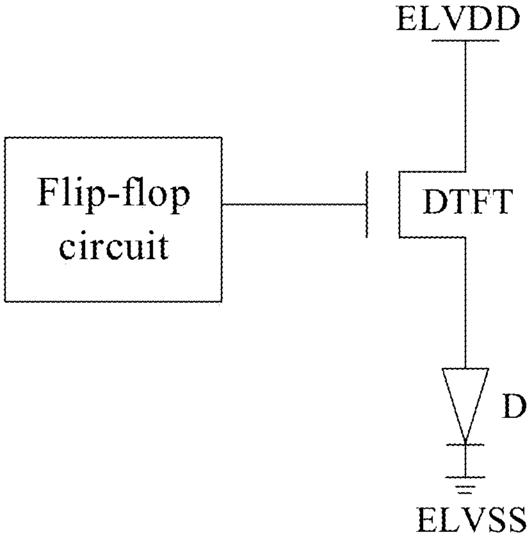
FIG. 29 is a schematic diagram of a pixel driving circuit according to an embodiment of the present disclosure.

FIG. 29 is a schematic diagram of a pixel driving circuit according to an embodiment of the present disclosure. As shown in FIG. 29, in a second aspect, the embodiment of the present disclosure provides a pixel driving circuit, including a driving transistor DTFT and a flip-flop circuit connected to a control electrode of the driving transistor. The flip-flop circuit may be the flip-flop circuit in any one of the above examples. A first electrode of the driving transistor DTFT is connected to a first driving power supply terminal, a second electrode of the driving transistor DTFT is connected to a first electrode of a light emitting device to be driven, and a second electrode of the light emitting device to be driven is connected to a second driving power terminal. The driving circuit has a simple structure, so that a voltage at the first driving power supply terminal is in a range from about 3V to 5V. In some examples, the light emitting device includes, but is not limited to, an LED or an OLED.

For the pixel driving circuit, when the driving transistor DTFT is turned on, a current drives the light emitting device to emit light, and when the driving transistor DTFT is turned off, the light emitting ends. A signal output by the output terminal HF_Output of the AND gate of the flip-flop circuit is written into a control electrode of the driving transistor DTFT of the pixel driving circuit, and a turn-on duration of the driving transistor DTFT is adjusted by adjusting the duty ratio of the clock signal, to realize the gray scale display. When the duty ratio is low, the driving transistor DTFT has the less turn-on duration, so that a light emitting duration is less, to realize a low gray scale display. When the duty ratio is high, the driving transistor DTFT has the great turn-on duration, so that the light emitting duration is great, to realize a high gray scale display. In the embodiment of the present disclosure, in order to realize the gray scale display, it is only necessary for the light emitting device to emit light having a stable brightness at any one or more fixed levels. The low gray scale display is realized by controlling the light emitting duration, so that the problem is avoided that the light emitting device is unstable at a low brightness.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A flip-flop circuit, comprising an input sub-circuit, an AND gate, a control sub-circuit, a duty ratio adjustment sub-circuit, and a reset sub-circuit; wherein the AND gate comprises a first input terminal, a second input terminal and an output terminal, and is configured to control a clock signal output from the output terminal based on input signals of the first input terminal and the second input terminal of the AND gate, and each clock cycle of the clock signal jumps between a first power supply voltage and a second power supply voltage;

the input sub-circuit is configured to write the second power supply voltage into at least one of the first input terminal and the second input terminal in response to an input control signal to control the output terminal to output the first power supply voltage or the second power supply voltage;

the control sub-circuit is configured to control a potential at a first node through the second power supply voltage in response to a data voltage control signal, and the first node is a connection node between the control sub-circuit and the duty ratio adjustment sub-circuit;

the duty ratio adjustment sub-circuit is configured to control the output terminal to output the first power supply voltage in response to the potential at the first node so as to adjust a duty ratio of the clock signal; and the reset sub-circuit is configured to respond to a reset signal and reset the potential at the first node through the reset signal.

2. The flip-flop circuit of claim 1, wherein the AND gate comprises a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a second power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a first power supply voltage terminal, and a control electrode of the seventh transistor is connected to the second input terminal; and a control electrode of the eighth transistor is connected to the first input terminal.

3. The flip-flop circuit of claim 1, wherein the AND gate comprises a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a first power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a second power supply voltage terminal, and a control electrode of the seventh transistor is connected to the second input terminal; and a control electrode of the eighth transistor is connected to the first input terminal.

4. The flip-flop circuit of claim 2, wherein the input sub-circuit comprises a first transistor; and switching characteristics of the first transistor and the fifth transistor are the same;

a first electrode of the first transistor is connected to the second power supply voltage terminal, a second electrode of the first transistor is connected to the first input terminal, and a control electrode of the first transistor is connected to an input signal control terminal; the second input terminal is connected to the second power supply voltage terminal; or a first electrode of the first transistor is connected to the second power supply voltage terminal, a second electrode of the first transistor is connected to the first input terminal and the second input terminal, and a control electrode of the first transistor is connected to an input signal control terminal.

5. The flip-flop circuit of claim 4, wherein the duty ratio adjustment sub-circuit comprises a third transistor, a first capacitor, and a second capacitor; the control sub-circuit comprises a fourth transistor; switching characteristics of the third transistor and the switching characteristics of the first transistor are the same; and switching characteristics of the fourth transistor and the switching characteristics of the first transistor are opposite to each other;

a first electrode of the third transistor is connected to the first power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the second power supply voltage terminal, a second electrode of the fourth transistor is connected to the first node, and a control electrode of the fourth transistor is connected to a data voltage control signal terminal.

6. The flip-flop circuit of claim 4, wherein the duty ratio adjustment sub-circuit comprises a third transistor, a first capacitor, and a second capacitor; the control sub-circuit comprises a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor;

a first electrode of the third transistor is connected to the first power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the second power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the first input terminal.

7. The flip-flop circuit of claim 2, wherein the input sub-circuit comprises a first transistor; and switching characteristics of the first transistor and the fifth transistor are the same; and a first electrode of the first transistor is connected to the second power supply voltage terminal, a second electrode of the first transistor is connected to the second input terminal, and a control electrode of the first transistor is connected to an input signal control terminal; and the first input terminal is connected to the second power supply voltage terminal.

8. The flip-flop circuit of claim 7, wherein the duty ratio adjustment sub-circuit comprises a third transistor, a first capacitor, and a second capacitor; the control sub-circuit comprises a fourth transistor; switching characteristics of the third transistor and the switching characteristics of the first transistor are the same; and switching characteristics of the fourth transistor and the switching characteristics of the first transistor are opposite to each other;

a first electrode of the third transistor is connected to the first power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the second power supply voltage terminal, a second electrode of the fourth transistor is connected to the first node, and a control electrode of the fourth transistor is connected to a data voltage control signal terminal.

9. The flip-flop circuit of claim 7, wherein the duty ratio adjustment sub-circuit comprises a third transistor, a first capacitor, and a second capacitor; the control sub-circuit comprises a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor;

a first electrode of the third transistor is connected to the first power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the second power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the second input terminal.

10. The flip-flop circuit of claim 1, wherein the reset sub-circuit comprises a second transistor; and a first electrode of the second transistor is connected to a control electrode of the second transistor and a reset signal terminal, and a second electrode of the second transistor is connected to the first node.

11. A flip-flop circuit, comprising an input sub-circuit, an AND gate, a control sub-circuit, a duty ratio adjustment sub-circuit, and a reset sub-circuit; wherein the AND gate comprises a first input terminal, a second input terminal and an output terminal, and is configured to control a clock signal output from the output terminal based on input signals of the first input terminal and the second input terminal of the AND gate, and each clock cycle of the clock signal jumps between a first power supply voltage and a second power supply voltage;

the input sub-circuit is configured to write the first power supply voltage into at least one of the first input terminal and/or the second input terminal in response to an input control signal to control the output terminal to output the first power supply voltage or the second power supply voltage;

the control sub-circuit is configured to control a potential at a first node through the second power supply voltage in response to a data voltage control signal, the first node is a connection node between the control sub-circuit and the duty ratio adjustment sub-circuit;

the duty ratio adjustment sub-circuit is configured to control the output terminal to output the first power supply voltage in response to the potential at the first node to adjust a duty ratio of the clock signal; and the reset sub-circuit is configured to respond to a reset signal and reset the potential at the first node through the reset signal.

12. The flip-flop circuit of claim 11, wherein the AND gate comprises a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a second power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a first power supply voltage terminal, and a control electrode of the seventh transistor is connected to the second input terminal; and a control electrode of the eighth transistor is connected to the first input terminal.

13. The flip-flop circuit of claim 11, wherein the AND gate comprises a fifth transistor, a sixth transistor, a seventh transistor, and an eighth transistor; switching characteristics of the fifth transistor and the sixth transistor are the same; switching characteristics of the seventh transistor and the eighth transistor are the same and opposite to the switching characteristics of the fifth transistor; and a first electrode of the fifth transistor is connected to a first power supply voltage terminal, a second electrode of the fifth transistor is connected to a first electrode of the sixth transistor, and a control electrode of the fifth transistor is connected to the first input terminal; a second electrode of the sixth transistor is connected to the output terminal, and a control electrode of the sixth transistor is connected to the second input terminal; a first electrode of the seventh transistor is connected to a second electrode of the eighth transistor, a second electrode of the seventh transistor is connected to a first electrode of the eighth transistor and a second power supply voltage terminal, and a control electrode of the seventh transistor is connected to the second input terminal; and a control electrode of the eighth transistor is connected to the first input terminal.

14. The flip-flop circuit of claim 12, wherein the input sub-circuit comprises a first transistor; and switching characteristics of the first transistor and the fifth transistor are opposite to each other;

a first electrode of the first transistor is connected to the first power supply voltage terminal, a second electrode of the first transistor is connected to the first input terminal, and a control electrode of the first transistor is connected to an input signal control terminal; the second input terminal is connected to the second power supply voltage terminal; or a first electrode of the first transistor is connected to the first power supply voltage terminal, a second electrode of the first transistor is connected to the first input terminal and the second input terminal, and a control electrode of the first transistor is connected to an input signal control terminal.

15. The flip-flop circuit of claim 14, wherein the duty ratio adjustment sub-circuit comprises a third transistor, a first capacitor, and a second capacitor; the control sub-circuit comprises a fourth transistor; switching characteristics of the third transistor and the switching characteristics of the first transistor are the same; and switching characteristics of the fourth transistor and the switching characteristics of the first transistor are opposite to each other;

a first electrode of the third transistor is connected to the second power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the first power supply voltage terminal, a second electrode of the fourth transistor is connected to the first node, and a control electrode of the fourth transistor is connected to a data voltage control signal terminal.

16. The flip-flop circuit of claim 14, wherein the duty ratio adjustment sub-circuit comprises a third transistor, a first capacitor, and a second capacitor; the control sub-circuit comprises a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor;

a first electrode of the third transistor is connected to the second power supply voltage terminal and a second terminal of the second capacitor, a second electrode of the third transistor is connected to a first terminal of the first capacitor and the first input terminal, and a control electrode of the third transistor is connected to a first terminal of the second capacitor and the first node; and a second terminal of the first capacitor is connected to the first electrode of the fifth transistor; and a first electrode of the fourth transistor is connected to the first power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the first input terminal.

17. The flip-flop circuit of claim 12, wherein the input sub-circuit comprises a first transistor; and switching characteristics of the first transistor and the fifth transistor are opposite to each other; and a first electrode of the first transistor is connected to the first power supply voltage terminal, a second electrode of the first transistor is connected to the second input terminal, and a control electrode of the first transistor is connected to an input signal control terminal; and the first input terminal is connected to the second power supply voltage terminal.

18. The flip-flop circuit of claim 17, wherein the duty ratio adjustment sub-circuit comprises a third transistor, a first capacitor, and a second capacitor; the control sub-circuit comprises a fourth transistor; switching characteristics of the third transistor and the switching characteristics of the first transistor are the same; and switching characteristics of the fourth transistor and the switching characteristics of the first transistor are opposite to each other;

a first electrode of the third transistor is connected to the second power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the first power supply voltage terminal, a second electrode of the fourth transistor is connected to the first node, and a control electrode of the fourth transistor is connected to a data voltage control signal terminal.

19. The flip-flop circuit of claim 17, wherein the duty ratio adjustment sub-circuit comprises a third transistor, a first capacitor, and a second capacitor; the control sub-circuit comprises a fourth transistor, a ninth transistor and a tenth transistor; switching characteristics of the third transistor and the ninth transistor are the same as the switching characteristics of the first transistor; and switching characteristics of the fourth transistor and the tenth transistor are opposite to the switching characteristics of the first transistor;

a first electrode of the third transistor is connected to the second power supply voltage terminal and a second terminal of the second capacitor, a second electrode of the third transistor is connected to a second terminal of the first capacitor and the second input terminal, and a control electrode of the third transistor is connected to a first terminal of the second capacitor and the first node; and a first terminal of the first capacitor is connected to the second electrode of the seventh transistor; and a first electrode of the fourth transistor is connected to the first power supply voltage terminal and a second electrode of the tenth transistor, a second electrode of the fourth transistor is connected to a first electrode of the tenth transistor and a first electrode of the ninth transistor, and a control electrode of the fourth transistor is connected to a data voltage control signal terminal; a second electrode of the ninth transistor is connected to the first node, and a control electrode of the ninth transistor is connected to a reset signal terminal; and a control electrode of the tenth transistor is connected to the second input terminal.

20. A pixel driving circuit, comprising a driving transistor and the flip-flop circuit of claim 1; wherein the output terminal of the flip-flop circuit is connected to a control electrode of the driving transistor.

* * * * *